(12) United States Patent
Karumuri et al.

(10) Patent No.: US 12,211,090 B1
(45) Date of Patent: Jan. 28, 2025

(54) REDUCING FALSE POSITIVE DETECTIONS BASED ON CLASSIFICATION AND SEGMENTATION CUES

(71) Applicant: Amazon Technologies, Inc., Seattle, WA (US)

(72) Inventors: Gitika Karumuri, Santa Clara, CA (US); Miriam Bellver Bueno, Barcelona (ES); Amogh Gupta, New York, NY (US); Ashwin Swaminathan, Dublin, CA (US); Sunil Sharadchandra Hadap, Dublin, CA (US); Yuelong Li, Santa Clara, CA (US); Xin Shen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 17/689,345

(22) Filed: Mar. 8, 2022

(51) Int. Cl.
| | | |
|---|---|---|
| *G06T 7/11* | (2017.01) | |
| *G06Q 30/0601* | (2023.01) | |
| *G06T 7/73* | (2017.01) | |
| *G06V 40/10* | (2022.01) | |

(52) U.S. Cl.
CPC ..... *G06Q 30/0643* (2013.01); *G06Q 30/0627* (2013.01); *G06T 7/11* (2017.01); *G06T 7/73* (2017.01); *G06V 40/10* (2022.01); *G06T 2207/20081* (2013.01); *G06T 2207/20132* (2013.01); *G06T 2207/30196* (2013.01)

(58) Field of Classification Search
CPC .................................................. G06Q 30/0643
See application file for complete search history.

(56) References Cited

U.S. PATENT DOCUMENTS

2019/0392242 A1* 12/2019 Tariq ........................ G06V 20/58
2020/0211205 A1* 7/2020 LeGaye ............. G01B 11/2504
2022/0239825 A1* 7/2022 Tanaka ............. H04N 21/23418

* cited by examiner

*Primary Examiner* — Oneal R Mistry
(74) *Attorney, Agent, or Firm* — Lee & Hayes, P.C.

(57) ABSTRACT

A first region within image data corresponding to a first portion of a user is determined, and a classifier associated with the first portion of the user is determined. A second region within the image data that includes the first region is determined. Within the second region, first pixels corresponding to the first portion of the user, second pixels corresponding to a second portion of the user adjoined to the first portion of the user, and third pixels corresponding to an environment of the user are identified. Based on identifying the second pixels, the classifier associated with the first portion of the user is confirmed. Upon the confirmation an item is rendered on the first portion of the user.

20 Claims, 9 Drawing Sheets

REDUCING FALSE POSITIVE DETECTIONS BASED ON CLASSIFICATION AND SEGMENTATION CUES

BACKGROUND

Online shopping allows consumers to purchase goods, services, and the like from the convenience of their home, office, or place of business. Online purchasing of certain goods, such as apparel, accessories, or other wearables (e.g., shoes, watches, hat, etc.) often presents challenges. For example, consumers may find it difficult to understand a look of such items. Some retailers may offer virtual environments in which consumers may try on apparel, accessories, or other wearables. However, problems arise in instances where the items are incorrectly presented on consumers. In such instances, consumers may lack confidence when purchasing items online. Accordingly, items purchased online are often returned and consumers may lack confidence in online shopping.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
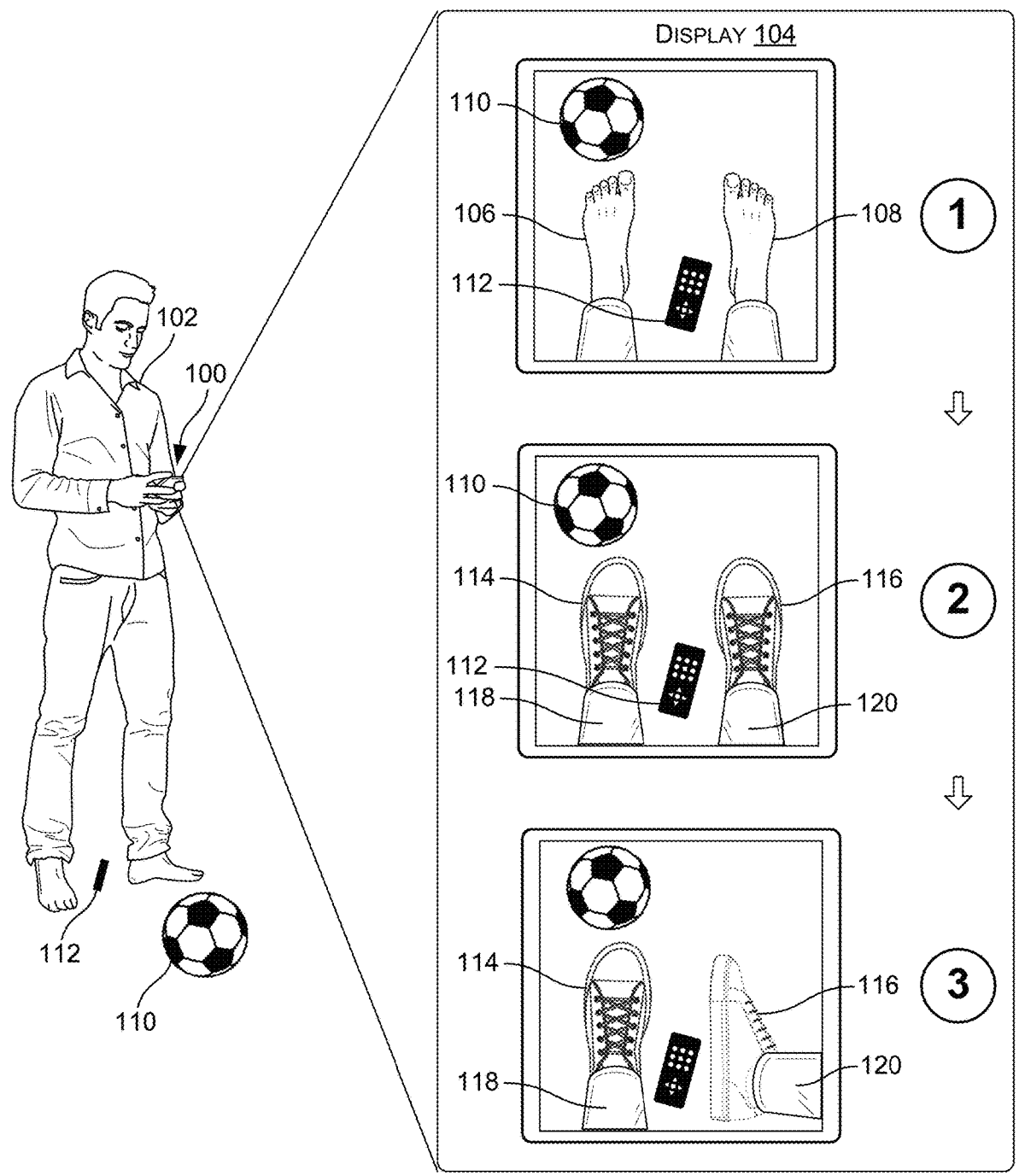
FIG. 1 illustrates an example device that provides a virtual try on environment for a user to view items for purchase, according to an example of the present disclosure.

This disclosure describes, in part, systems and methods for providing a virtual try on environment to a user. In some instances, the user may interact with a device when purchasing or shopping for apparel, accessories, or other wearables online. For example, the device may include a camera for capturing image(s) of a portion of the user, such as hands, feet, head, and the like onto which the apparel, accessories, or other wearables are rendered. In some instances, a multi-stage process is utilized for providing the virtual try on environment and for accurately classifying portions of the user. Initially, during a first stage, for example, and using computer vision and computer processing techniques, the device may detect portions of the user onto which the apparel, accessories, or other wearables are rendered. For example, within the images, portions of the user may be detected and classified. Detecting such portions of the user allows the apparel, accessories, or other wearables are rendered onto appropriate portions of the body. However, to confirm the detection and classification of the portions of the user, a multi-head network may be used to further analyze the images. During a second stage, for example, the systems and methods may determine, in parallel, a segmentation of the pixels within the image(s), an orientation of the portions of the user, and/or classification of the portions of the user. In this second stage, however, rather than analyzing an entirety of the image, the systems and method may analyze a specific region of the image, based on output from the first stage. That is, using the location of the detected portions of the user in the first stage, the computer vision and/or computer processing techniques may confirm whether the portions of the user were accurately detected. This allows the computer vision and/or computer processing techniques to filter out false positives such that the item(s) are properly and realistically rendered on portions of the user. The device also displays a real-time feed of the image(s) and/or video as captured, and which are used to render the apparel, accessories, or other wearables. In doing so, within the virtual try on environment, the user may adjust (e.g., pivot, rotate, etc.) portions of their body to visually observe the apparel, accessories, or other wearables on themselves. Rendering the apparel, accessories, or other wearables on appropriate portions of the user allows the user to make informed decisions and in turn, users may have improved experiences and/or increased confidence when purchasing online.

The user may interact with the device, or an application running on the device, when shopping or purchasing items online. As noted above, such items may include apparel (e.g., shirt, pants, etc.), accessories (e.g., earrings, make-up, etc.), or other wearables (e.g., shoes, hats, eyewear, handwear, etc.) that are offered for purchase. As part of this, the user may want to visually observe such items on themselves before making purchases. For example, the user may want to see how a particular item looks. In this instance, the device generates, offers, or otherwise provides the virtual try on environment in which the items are rendered onto portions of the user. For example, a watch may be rendered onto a wrist of the user, footwear may be rendered onto feet of the user, a hat may be rendered onto a head of the user, and so forth. However, such examples are merely illustrative and it is to be understood that the techniques disclosed herein may be applicable to other items, portions of the user, and/or other environments.

In some instances, the device may determine particular items that the user is shopping for, and based on the items, determine a respective portion of the user needed for providing the virtual try on environment. When using the application, for example, the user may engage with the application, and correspondingly, the application may instruct the user to capture image(s) of themselves. For example, in the instance that the user is shopping for footwear, image(s) of one or more feet of the user are captured. Here, the user may position the device to capture image(s) of their feet. For example, the user may point a camera of the device downwards towards their feet. The device may represent any type of suitable device, such as a phone, tablet, or computing device having the camera or other imaging sensor. Additionally, in some instances, the user may place the device on a desk, floor, stand, or other surface within an environment or may hold the device for capturing the image(s).

Initially, as part of a first stage, the computer vision and/or computer processing techniques detect regions within the image(s) corresponding to portions of the user of interest, such as the feet of the user. As part of this, the computer vision and/or computer processing techniques may utilize machine-learned model(s) to detect the feet of the user within image(s) captured by the camera. For example, the machine-learned model(s) may have been previously trained to detect toes, heels, arches, and other anatomical portions of the feet for use in detecting the presence, location, and/or existence of the feet within image(s). After or as part of detecting the feet, a location of the feet within the image(s) are determined. The location of the detected feet, as discussed herein, is used to create a bounding box for confirming whether the images actually contain the feet.

Additionally, such computer vision and/or computer processing techniques may also be configured to classify left and right feet of the user, or to distinguish between left and right feet. For example, the computer vision and/or computer processing techniques may classify a foot as detected within the image data as corresponding to the left foot or the right foot. That is, once the feet are detected, the computer vision and/or computer processing techniques may classify the feet. By detecting the feet within the image(s), the device is able to determine location(s) within the image(s) onto which the footwear is rendered. For example, knowing the location(s) of the feet, as well as the left foot and right foot of the user, the device is able to accurately render left footwear and right footwear onto the left foot and right foot of the user.

In some instances, the image(s) captured may represent the portion of the user in a plurality of arrangements. For example, in the event that the user is trying on footwear, the image(s) may represent bare feet of the user, socks being worn by the user, shoes being worn by the user, and so forth. In such instances, the computer vision and/or computer processing techniques (e.g., using the machine-learned model(s)) are configured to detect and classify the feet of the user, regardless of the specific image(s) being captured. That is, the computer vision and/or computer processing techniques are configured to detect the feet of the user, as well as footwear of the user (e.g., socks, shoes, sandals, etc.) for use in providing the virtual try on environment. In such instances, however, the location, presence, and/or classification of the foot is determined.

The systems and methods disclosed herein, however, may filter out false-positives as a way to accurately represent the item(s) on the user or to confirm that the feet were accurately detected and classified. For example, within the image(s), bounding boxes may be placed around the detected feet of the user from the first stage. Noted above, the bounding boxes may be placed around those locations in the image in which the feet were detected. In some instances, the bounding boxes are centered or placed around a location within the image corresponding to the foot. For example, the bounding box may include four corners that are centered or placed around the location of the foot.

The bounding box may be used to determine a region of interest within the image. For example, once the bounding box is determined, a region of interest (e.g., another bounding box) may be determined. The region of interest is sized larger than the bounding box in order to consider a context of the previously detected foot. The context, in this instance, may be whether the detected foot is associated with or adjoined to a leg. For example, the region of interest may be sized to determine whether a leg or pants (or other legwear) is present. The presence of the leg may be used to confirm that the portion of the user detected is in fact a foot of the user, as compared to other objects in the environment (e.g., table, remote, etc.) and/or other portions of the user (e.g., hand, knee, etc.). That is, to provide a realistic virtual try on environment, the computer vision and/or computer processing techniques may utilize the region of interest to confirm whether the feet detected within the image(s) are in fact feet of the user.

The region of interest is cropped from a remaining portion of the image and delivered or input to the multi-head network. The region of interest that is cropped is based on an output from the first stage, or as determined from the first stage. For example, using the output of the first stage, which may indicate the detection of the feet, the region of interest may be cropped around the feet and then input into the multi-head network to filter out false positive (e.g., instances in which feet were incorrectly identified).

The heads of the multi-head network may operate in parallel and serve to confirm the detection and/or classification of the portions of the user. That is, during the second stage, the multi-head network may confirm the output of the first stage. Each of the heads may perform respective operations on the region of interest as cropped from the image(s). That is, each of the heads of the multi-head network may receive the cropped region for filtering out false-positives. If the outputs from any of the heads indicate that the feet are not detected or are not classifiable (e.g., cannot distinguish between left and right feet), the item(s) may be refrained from being displayed on the user. Performing this process in parallel may reduce an amount of time required to filter out false positives of feet being detected and allow for the footwear to be more quickly rendered on the user.

In some instances, as part of determining whether the feet were correctly detected and classified, the computer vision and/or computer processing techniques may segment pixels within the region of interest corresponding to a background of the environment (e.g., carpet, wood floor, tile, etc.), the foot, the leg, and/or legwear worn by the user. Segmenting the pixels may represent a first head of the multi-head network. Segmenting the pixels allows the computer vision and/or computer processing techniques to determine (or label) those pixels corresponding to the background, the foot, the leg, and/or the legwear. Here, and as noted above, if pixels corresponding to the leg and/or the legwear are not identified within the region of interest, the computer vision and/or computer processing techniques may determine a lack of the feet within the image(s) (i.e., that the feet were incorrectly detected during the first stage). Alternatively, if the computer vision and/or computer processing techniques determine that pixels corresponding to the legwear were identified, the computer vision and/or computer processing techniques may determine, or confirm, a detection of the feet. In some instances, the computer vision and/or computer processing techniques may utilize machine-learned model(s) to identify the pixels in the region of interest corresponding to the background, the leg, the legwear, and so forth.

Additionally, the region of interest may be analyzed to determine a classification of the feet as detected and classified during the first stage. Classifying the feet may represent a second head of the multi-head network. For example, using the computer vision and/or computer processing techniques on the region of interest as cropped from the image(s), as compared to an entirety of the image(s), may determine another classification of the feet. This classification may be determined using machine-learned model(s) that are trained to detect and classify feet within the image(s) or within the cropped region of interest of the images. In some instances, the machine-learned model(s) that confirm or deny the classification of the feet from the first stage may be trained on false positives as output from the first stage and/or common failure scenarios from the first stage. Here, this allows for the effective filtering of incorrect detections and/or classifications from the first stage. If the feet are unable to be detected within the region of interest, or the feet are unable to be classified, the systems and methods refrain from rendering the items on the user.

Furthermore, to accurately render the items on the user, an orientation and/or reference points (e.g., landmarks) of the portion of the user may be identified. Determining the orientation and/or reference points of the portion of the user may represent a third head of the multi-head network. The orientation may be associated with a directionality and/or position of the portion of the user, while the reference points may be associated with points of reference on the user, and which are associated with the portion of the user of interest. For example, when trying on footwear, the orientation may indicate which direction the left foot and/or the right foot are pointing, as well as any bends, pivots, or rotation of the left and/or right feet (e.g., bent upwards, sideways, downwards, etc.). The reference points may indicate, for example, a location of a big toe, a small toe, a heel, an arch of the foot, and so forth. In some instances, the orientation and/or reference points are used when rendering the footwear onto the user. For example, by knowing which direction the feet of the user are facing, and/or how the ankle is bent, or positioned, the footwear is correspondingly fitted to the user.

The multi-head network therefore serves to process, in parallel, a cropped region of the image data to confirm the detection and classification of the feet, as well as to determine the orientation of the foot. The cropped region of the image data is determined using an output of the first stage, which indicates a region of the image data corresponding to the feet. This region is then used to define a larger region that is input into the multi-head network. The multi-head network includes suitable architecture that is able to process the cropped region in parallel, prior to rendering the item(s) on the user, to confirm the detection and classification of the feet.

After the multi-head network confirms the detection and classification of the feet, item(s) are rendered on the user. In some instances, the item(s) provided to user to virtually try on are modeled and are stored on the device. The model is available to the device and may be associated with a three-dimensional (3D) model that provides views of the item in 3D space and 360 degrees. Therefore, regardless of the orientation and/or position of the portion of the user, the item may be fitted onto the user. For example, continuing with the above example, based on the orientation and/or position of the feet, a corresponding view of the footwear is selected such that the footwear is fitted to the feet of the user. This rendering of the footwear on the user, at the particular orientation and/or position of their feet, creates a realistic virtual try on environment to the user. In doing so, the user may pivot, rotate, or otherwise maneuver their feet for viewing the footwear at different angles. Through this process the user may continue to position the device (and the camera) to capture a real-time feed of the portion of the user for rendering the footwear onto the feet. In such instances, the device continuously determines the detection, classification, orientation, and so forth of the feet for accurately rendering the footwear onto the user. The footwear may also be scaled based on a size of the feet, or to match the size of the feet as portrayed in the image(s) and/or presented by the device. For example, the footwear may be scaled to match those pixels in the image data identified as the feet. As such, the display provides a real-time feedback and display for allowing the user to virtually observe the footwear.

Additionally, as part of rendering the items on the user, the pixels associated with the background, portion of the user, and/or clothing of the user may be used. These pixels may be determined from the multi-head network. In some instances, the pixels may be ordered as a hierarchy to determine which pixels are rendered on top of and/or beneath the item. Pixels associated with a background of the image(s) may include a lowest hierarchy, pixels associated with the portion of the user of interest may include a hierarchy greater than the pixels of the background, pixels associated with the item may include a hierarchy greater than the pixels of the portion of the user of interest, and pixels associated with clothing of the user may have a highest hierarchy. For example, when rendering footwear on the feet, first pixels of the background have the lowest hierarchy such that the footwear and the user are displayed on top of the environment. Second pixels of the feet (e.g., the portion of the user of interest) include a hierarchy lower than the footwear such that the footwear is displayed on (e.g., on top of) the foot of the user. Third pixels, such as pixels associated with a pant leg of the user includes a highest hierarchy such that the pant leg (if present) is displayed over a corresponding portion of the footwear. In this sense, in the event that the pant leg covers a portion of the footwear, such as the heel, the rendering provides a realistic impression of such.

As noted above, the techniques disclosed herein may be extended to providing a virtual try on environment for items other than footwear. For example, when trying on handwear, such as watches, bracelets, rings, gloves, and the like, the computer vision and/or computer processing techniques may be trained to detect hands of the user within the image(s). Therein, regions of interest within the image(s) may be cropped and segmented to determine whether pixels corresponding to the wrist, arm, sleeves of apparel worn by the user are present. Such determination may confirm whether the hands of the user have been correctly identified. In such instances, this may also include classifying left and right hands of the user such that the handwear is properly rendered onto appropriate hands of the user. Additionally, the item(s) may be rendered in different styles, sizes, colors, and the like such that the user may scroll through and observe options associated with the item(s).

In some instances, the device may communicatively couple to one or more remote computing resource(s). The remote computing resources may, in some instances, perform operations similar to those as the device for presenting or causing presentation of the virtual try on environment to the user. The remote computing resource(s) may also train the machine-learned model(s) used to detect and classify the portion of the body (e.g., feet), segment the pixels within the region of interest, and so forth. The remote computing resource(s) may also store model(s) (e.g., 3D models) of the items that are transmitted to the device for rendering. In such instances, the processes described herein may be carried out by the device and/or the remote computing resources.

Therefore, in light of the above, the systems and methods described herein provide a real-time virtual try on environment to the user. By providing the virtual try on environment to the user, for example, the user is able to visually observe themselves wearing item(s) for purchase. As part of this, image(s) of the user may be captured for rendering the item(s) onto a portion of the user (e.g., feet, hands, face, etc.). In such instances, the system(s) and methods herein detect and classify portion of the user within specific region (s) of the image(s). The region(s) of the image(s) are then processed or input into a multi-head network that confirms the detection and classification of the portions of the user. The multi-head network confirms whether the portion of the user were correctly detected and classified in the image(s). Determining whether the portion of the user were correctly detected and classified ensures that the item(s) are rendered appropriately onto the user. This prevents the item(s) being rendered on other objects within an environment such as chairs, tables, headphones etc. By avoiding rendering footwear, for example, on objects other than the feet of the user, the footwear is realistically rendered on the user.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a device 100 having a camera configured to capture image data (e.g., still image data, video image data, etc.) representing a user 102 within an environment. The environment may include the user 102 and a plurality of other objects or items, such as a table(s), furniture, plant(s), remote(s), and so forth.

Within the environment, the user 102 may be operating the device 100 for capturing image(s) of themselves, or portions of themselves, as part of a virtual try on environment. For example, the device 100 is shown including a display 104 that presents various user interface (UIs) to the user 102 associated with the virtual try on environment. As part of the virtual try on environment, the device 100 is configured to capture image(s) of the user 102 for detecting the portion of the user 102, classifying the portion of the user 102, and determining an orientation of the portion of the user 102. For example, in the event that the user 102 is shopping for wristwear, such as a watch, image(s) of the wrist, hand, and/or arm of the user 102 are captured. As it relates to FIG. 1, the user 102 may be shopping for footwear, such as shoes.

As discussed herein, image(s) of the user 102 are captured using the camera of the device 100. In this example, the feet of the user 102 are detected and classified for use in rendering the footwear onto the feet of the user 102. As will also be further discussed herein, in some instances, after detecting and classifying the portion of the user 102 corresponding to the feet, and before rendering the footwear onto the feet, the device 100 may analyze a specific region of the image(s) corresponding to the detected portion of the feet to confirm whether the feet are accurately detected and classified. As part of this process, an area within the image associated with the feet are cropped to discern information about the feet, such as orientation and classification (e.g., left foot versus right foot). Therein, as part of the confirmation, image(s) of the user 102, or the portion of the user 102, are displayed on the device 100, along with the footwear, for observation by the user 102. Such process may assist the user 102 in making informed decisions about purchasing the footwear.

To illustrate, at "1" the display 104 is shown displaying an image of the user 102 within the environment. Such image is captured via the camera of the device 100. The user 102 may hold the device 100 such that the camera of the device 100 is oriented towards the feet of the user 102 (or a particular portion of the user 102 desired as part of the virtual try on environment). However, in some instances, rather than using a mobile device (e.g., phone), a desktop computer or a laptop computer positioned on a desk may be used to capture and present the image(s). In some instances, an application operating on the device 100 may instruct the user 102 as to how to hold or position the device 100, or what portions of the user 102 are of interest. The user 102 may engage with the application, and correspondingly, the application may instruct the user 102 to capture image(s) of themselves. The image(s) may be captured in real-time or may, in some instances, be previously stored image(s).

In some instances, the image is presented as a stream back to the user 102 on the display 104. As shown at "1" the left foot 106 and the right foot 108 of the user 102 are shown displayed, along with other objects in the environment, such as a ball 110 and a remote 112. The device 100, using computer vision and computer processing techniques, and as shown, is able to initially detect and classify the left foot 106 and the right foot 108 of the user 102. For example, the device 100 may store trained machine-learned model(s) that are configured to detect and classify the left foot 106 and the right foot 108. The machine-learned model(s) are configured to detect and classify the left foot 106 and the right foot 108, from other objects in the environment, such as the ball 110 and the remote 112. Detecting the left foot 106 and the right foot 108 may entail determining a location in the image(s) corresponding to the left foot 106 and the right foot 108, respectively. Classifying the left foot 106 and the right foot 108 may entail determining which foot of the user 102 corresponds to the left foot 106 and which foot of the user 102 corresponds to the right foot 108. Determining and classifying the left foot 106 and the right foot 108 enables the device 100 to properly render the footwear on the user 102. Such detection and classification of the left foot 106 and the right foot 108 may be determined using machine-learned models. For example, the image(s) may be input into the machine-learned model(s), and the output of the machine-learned models may indicate whether feet were detected (and where), as well as in instances where the feet were detected, the classification of such.

In some instances, and as will be discussed herein, the device 100 may utilize a multi-head network to determine whether the feet of the user 102 have been correctly detected and classified. The multi-head network may serve to filter out false positives in which non-feet objects were detected and classified. For example, at a first instance, the left foot 106 and the right foot 108 may be detected and classified. However, in some instances, such detection and/or classification may be incorrect. In order to prevent the footwear being rendered improperly on the user 102, or on other objects within the environment corresponding to non-feet objects, the device 100 may confirm the detection and classification of the left foot 106 and the right foot 108. For example, bounding boxes may be placed around the areas within the image(s) corresponding to the left foot 106 and the right foot 108. The bounding boxes may indicate a lack or presence of the leg, pants being worn by the user 102, and so forth. Here, if pixels within the bounding boxes do not correspond to the leg or pants of the user 102, for example, the detection and/or classification of the left foot 106 and/or the right foot 108 may be incorrect. That is, the device 100 may confirm whether the left foot 106 and/or the right foot 108 have been correctly detected and/or classified by determining whether the leg or pants of the user 102 are present. Here, the computer vision and/or computer processing techniques may indicate such, and/or trained machine-learned model(s) may indicate a presence of the leg or pants of the user 102 within the image(s).

Additionally, an orientation of the left foot 106 and the right foot 108 may be determined. This may indicate how the left foot 106 and/or the right foot 108 are oriented in the image(s) (e.g., pointing direction, bent, rotated, etc.). Such determination may allow the footwear to be properly rendered on the user 102. Further, knowing the orientation of the left foot 106 and the right foot 108 allows for a corresponding image of the footwear to be rendered on the user 102. For example, the device 100 may have access to a 3D model of the footwear, and based on the orientation of the left foot 106 and the right foot 108, respectively, a corresponding image of the footwear may be displayed on the feet of the user 102 (i.e., from a corresponding perspective of the footwear). As will be further discussed herein, although FIG. 1 illustrates that the feet of the user 102 are bare, the feet of the user 102 may be detected and classified when the user 102 is wearing socks, sandals, or other footwear. As such, the user 102 may not be required to remove their previous footwear when trying on other footwear.

Each head of the multi-head network may operate in parallel to confirm the detection and classification of the feet, as well as to determine the orientation of the feet. As explained herein, a first head may segment the pixels, a second head may classify objects detected in the image for determining whether a foot is present, and a third head may determine the orientation of the feet. Each of the heads may receive a cropped region of the image data. The cropped region of the image data is determined using an output of a first stage, which indicates a region of the image data corresponding to the feet. This region is then used to define a larger region that is input into the multi-head network.

At "2" left footwear 114 is shown being rendered on the left foot 106 and right footwear 116 is shown being rendered on the right foot 108. By detecting and classifying the left foot 106 and the right foot 108 of the user 102, the device 100 is able to display the left footwear 114 on the left foot 106 and the right footwear 116 on the right foot 108, as compared to the left footwear 114 on the right foot 108, for example. That is, during rendering of the left footwear 114 and the right footwear 116 within the virtual try on environment, the device 100 may use previously determined classifications of the feet to understand which foot of the user 102 corresponds to the left foot 106 and which foot of the user 102 corresponds to the right foot 108. This classification permits an accurate rendering of the left footwear 114 on the left foot 106 and the right footwear 116 on the right foot 108. Additionally, the location of the left foot 106 and the right foot 108, as determined during the detection of the left foot 106 and the right foot 108, is used to render the left footwear 114 on the left foot 106 and the right footwear 116 on the right foot 108.

As shown at "2", the left footwear 114 and the right footwear 116 are displayed on the user 102, according to the orientation of the left foot 106 and the right foot 108. For example, the left foot 106 and the right foot 108 are oriented outwards, in front of the user 102. When rendering the left footwear 114 and the right footwear 116 on the user 102, such orientation allows the left footwear 114 and the right footwear 116 to be rendered properly on the user 102. That is, the toe cap of the footwear may be aligned with the toes of the user 102, and the heel of the footwear may be aligned with the heels of the user 102, respectively. Further, the left footwear 114 and the right footwear 116 are shown on the left foot 106 and the right foot 108, respectively, as compared to other objects in the environment, such as the ball 110 and the remote 112. By accurately detecting and classifying the left foot 106 and the right foot 108, even though the image(s) contain other objects, the left footwear 114 and the right footwear 116 are rendered on the left foot 106 and the right foot 108 of the user 102. Noted above, such detection and classification may come by way of machine-learned model(s), and a multi-head network used to confirm the initial detection and classification of the left foot 106 and the right foot 108.

Noted above, within the image(s), pixels with a region of interest associated with a background, legs, legwear, and so forth may be identified. This identification may be used to create a hierarchy of the pixels for rendering the footwear on the user 102. For example, at "2" a left legwear 118 and a right legwear 120 may occlude certain portions of the left footwear 114 and the right footwear 116, respectively. The identification as to which portions of the left footwear 114 and the right footwear 116 are to be occluded may be based on a location of the pixels corresponding to the left legwear 118 and the right legwear 120, relative to a location of the left foot 106 and the right foot 108. In doing so, when displaying the left footwear 114 and the right footwear 116, portions of the left legwear 118 and the right legwear 120 may be displayed on top of portions of the left footwear 114 and the right footwear 116 respectively. This hierarchy of the pixels, or portions of the image(s), may increase a realness of the virtual try on environment.

As part of the virtual try on environment, the user 102 may adjust their feet to view the footwear at different angles. In this sense, as the user 102 adjusts their feet, additional image(s) are captured from the camera and are used for rendering the footwear on the user 102. For example, at "3" the user 102 may tilt the right foot 108 sideways, to observe a side of the right footwear 116. In this instance, the camera of the device 100 may capture additional image data that is analyzed to determine a detection of the feet, determine the classification, and determine an orientation of the feet. Such process identifies the right foot 108 of the user 102 for use in rendering the right footwear 116 onto the right foot 108, and based on the orientation and/or position of the right foot 108. A similar process occurs for the left foot 106. The left legwear 118 and the right legwear 120 are further shown occluding certain portions of the left footwear 114 and the right footwear 116. In instances where the user 102 is not wearing pants, for example, the legs of the user 102 may be displayed instead.

In some instances, at "3" the user 102 may be segmented from the objects within the environment. For example, ball 110, the remote 112, and/or other objects not corresponding to the user 102 (e.g., the left leg and/or the right leg) or the shoes (e.g., the left footwear 114 and/or the right footwear 116), may be omitted and not displayed. In some instances, this may assist the user 102 in trying on the shoes and without distractions of other objects on the display 104.

Although FIG. 1 illustrates capturing image(s) of both feet of the user 102, for rendering the left footwear 114 and the right footwear 116, in some instances, only one of the feet of the user 102 may be present. For example, the left foot 106 of the user 102 may only be within a field of view of the camera. In such instances, the computer vision and computer processing techniques may detect and classify the left foot 106 for rendering the left footwear 114 on the user 102. Additionally, even though particular footwear are shown on the user 102, sandals, boots, heels, and the like may be presented.

Figure 2:
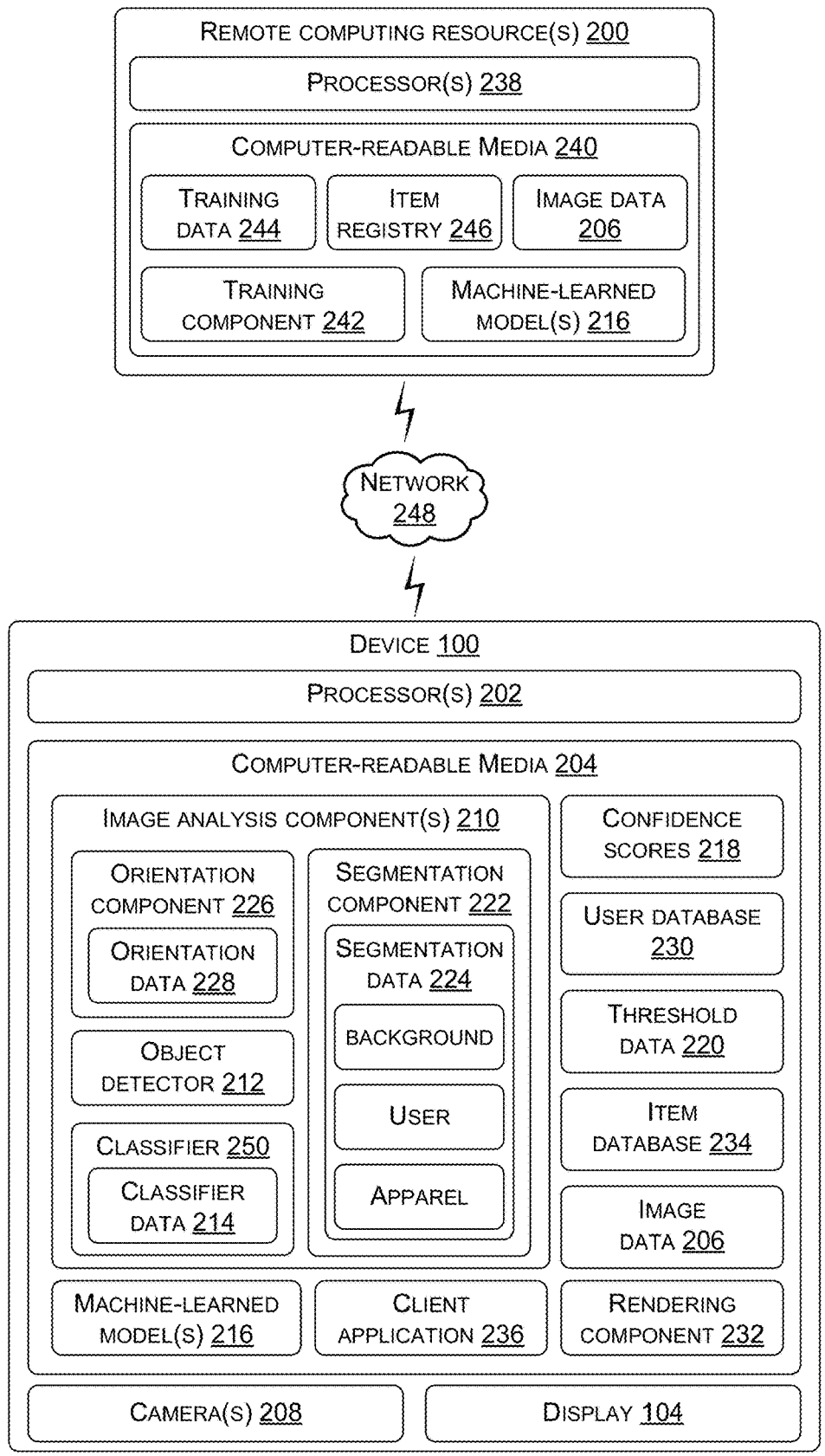
FIG. 2 illustrates example components of the device of FIG. 1 and remote computing resource(s) in communication with the device, according to an example of the present disclosure.

FIG. 2 illustrates select components of the device 100 and remote computing resource(s) 200 that are communicatively coupled to the device 100. The device 100 may represent any type of device, for example, a computer, laptop, tablet, mobile phone, television, and the like. The device 100 is shown including processor(s) 202 that perform various functions or operations associated with providing a virtual try on environment to the user 102, and computer-readable media 204 storing instructions executable by the processor(s) 202 to perform the operations described herein.

The computer-readable media 204 may store or otherwise have access to image data 206. The image data 206 may represent image(s) as captured by camera(s) 208 of the device 100. For example, the camera(s) 208 may capture the image data 206 of the user 102, or portions of the user 102, an environment, and so forth. In some instances, the image data 206 may represent static image(s), a series of image(s), or video(s). In some instances, the camera(s) 208 may include any suitable camera, such as a still camera, a video camera, a depth camera, image sensor, etc. Although the device 100 is shown including the camera(s) 208, in some instances, the camera(s) 208 may be separate from the device 100 (e.g., external camera.) or a component of another device communicatively coupled to the device 100 (e.g., webcam).

The display 104 may output a live feed (e.g., stream) of the image data 206 as captured by the camera(s) 208, along with renderings of item(s) on the user 102. Such display presents the virtual try on environment by allowing the user to virtually observe the item(s) being worn prior to making purchases. The display 104 may represent any suitable display, such as a liquid crystal display (LCD), a led emitting diode (LED) display, an organic LED (OLED) display, and so forth.

The device 100 is shown including image analysis component(s) 210 that analyze the image data 206. The image analysis component(s) 210 may analyze the image data 206 using computer vision and/or computer processing techniques in order to detect and classify portions of the user 102, such as feet of the user 102 within the image data 206. The computer vision and/or computer processing techniques may be trained based on one or more object recognition techniques to identify different objects with the image data 206. The one or more object recognition techniques may include at least appearance-based methods and feature-based methods. For instance, the one or more object recognition techniques may include edge matching, divide-and-conquer search, greyscale matching, gradient matching, interpretation trees, hypothesize and test, or the like. However, the image analysis component(s) 210 may utilize other techniques to detect and classify the user 102 represented within the image data 206.

In some instances, the image analysis component(s) 210 includes, or utilizes, an object detector 212. The object detector 212 may be configured to detect object(s) within the image data 206. Generally, the object detector 212 is trained to detect the objects within the environment. As such, the image analysis component(s) 210 may discern, from the object detector 212, those regions within the image data 206 corresponding to the left foot 106 and the right foot 108, or regions within the image data 206 not corresponding to the left foot 106 the right foot 108. Here, the image analysis component(s) 210 may understand which regions of the image data 206 are not of interest given their inclusion of objects other than the left foot 106 and the right foot 108.

In some instances, the object detector 212, or more generally the image analysis component(s) 210, may utilize machine-learned model(s) 216 to detect the objects within the image data 206. For example, the machine-learned model(s) 216 may be trained from a database (e.g., historical data, such as image data, of past feet that were identified, or past feet that were not identified) to analyze the image(s) captured by the camera 208. In some instances, the machine-learned model(s) 216 may detect characteristic(s) of the feet, such as shape, size, orientation, and the like to detect the feet. However, the machine-learned model(s) 216 may also be trained to detect other objects in the image data 206. In some instances, the object detector 212 places bounding boxes around the object identified within the image data 206. For example, as part of detecting the objects, the object detector 212 may determine a location of the objects in the image data 206, and use this location to generate a bounding box around the object.

The image analysis component(s) 210 includes or utilizes a classifier 250. The classifier 250 may classify the objects detected by the object detector 212. The classifier 250 may attach labels or otherwise classify the object(s) detected from the object detector 212. For example, using the bounding boxes created by the object detector 212, the classifier 250 may classify the detected objects. For example, the classifier 250 may generate classifier data 214 that classifies the object(s) within the environment. The classifier data 214 may include classifications of the feet of the user 102 (e.g., the left foot 106 and the right foot 108), other portions of the user 102 (e.g., leg, face, arms, hands, etc.), household objects (e.g., furniture, clothing, food, etc.), and so forth.

In some instances, confidence scores 218 are generated and associated with objects that are detected in the image data 206. The confidence scores 218 may be determined by accessing data associated with the feet, such as the image data 206, providing the image data 206 as input to the machine-learned model(s) 216, and generating, as output from the machine-learned model(s) 216, the confidence scores 218. The confidence scores 218 may relate to a probability or likelihood that a foot in the image data 206 corresponds to a foot. In other words, the confidence scores 218 determined may be machine-learned scores.

Machine learning generally involves processing a set of examples (called "training data") in order to train a machine learning model(s). A machine learning model(s), once trained, is a learned mechanism that may receive new data as input and estimate or predict a result as output. For example, a trained machine learning model may comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model may be trained to infer a probability, or a set of probabilities, for a classification task based on unknown data received as input. In the context of the present disclosure, the unknown input may be the image data 206, and the machine-learned model(s) 216 may be tasked with outputting the confidence scores 218 that indicates, or otherwise relates to, a score, confidence, or probability of the left foot 106 and the right foot 108 being detected. In some instances, the confidence scores 218 may also indicate which foot in the image data 206 corresponds to the left foot 106, and which foot in the image data 206 corresponds to the right foot 108. Confidences of each may be determined. That is, the machine-learned model(s) 216 may determine a confidence of the left foot 106 being detected within the image data 206 and/or a confidence of the right foot 108 being detected within the image data 206.

Training data that is used to train machine-learned model(s) 216 may include various types of data. In general, training data for machine learning may include two components, features and labels. However, in some instances, the training data used to train the machine-learned model(s) 216 may be unlabeled. Accordingly, the machine-learned model(s) 216 may be trainable using any suitable learning technique, such as supervised learning, unsupervised learning, semi-supervised learning, reinforcement learning, and so on. The features included in the training data may be represented by a set of features, such as in the form of an n-dimensional feature vector of quantifiable information about an attribute of the training data. The following is a list of example features that may be included in the training data for training the machine-learned model(s) 216 described herein. However, it is to be appreciated that the following list of features is non-exhaustive, and features used in training may include additional features not described herein, and, in some cases, some, but not all, of the features listed herein. Example features included in the training data may include, without limitation, a width of the feet, a length of the feet, a height of the feet, a shape of the feet, specific portions of the feet, such as heel, archway, toes, sides, a color of the feet (including hue, shade, tint, etc.), and so forth. The machine-learned model(s), however, may also detect and classify feet in instances where the user 102 is wearing footwear (e.g., socks or shoes). In such instances, the feet may be detected and/or classified by locating shoelaces, a tongue, heel, toe cap, and so forth. In some instances, the features included within the training data may be associated with feet that were labeled or unlabeled (e.g., objects that do not correspond to the feet). As will be explained herein, the remote computing resource(s) 200 may train the machine-learned model(s) 216 and then transmit the machine-learned model(s) 216 to the device 100 for use in the virtual try on environment.

Additionally, the machine-learned model(s) 216 may be trained from those instances in which feet where incorrectly detected and/or classified within the image data 206. For example, in instances where feet were detected and/or classified at the first stage, but where later determined to be incorrectly detected and/or classified, these instances are used to train the machine-learned model(s) 216. In this sense, the machine-learned model(s) 216 may be trained on the false positives of the first stage and common failure cases of the first stage. Using these use cases to train the machine-learned model(s) 216 may permit the machine-learned model(s) 216 to accurately and effectively filter out those instances in which feet were previously incorrectly detected and classified. In future instances, the machine-learned model(s) 216 may be trained to filter out such occurrences.

In some instances, the image analysis component(s) 210 is configured to compare the confidence scores 218 to confidence thresholds stored within threshold data 220. For example, to avoid rendering footwear on top of objects in the image data 206 that do not correspond to the feet, or objects other than feet, the confidence scores 218 may be compared to the confidence threshold. In this sense, if the detected feet do not have a confidence that satisfies a threshold confidence, then the footwear may not be rendered on the user 102. Here, although feet may have been detected, the confidence scores 218 may indicate a low confidence that the detected feet are in fact feet. In instances where the confidence scores 218 are greater than the confidence threshold, the image analysis component(s) 210 may be confident that the detected feet are in fact feet. However, if the confidence scores 218 are less than the confidence threshold, the image analysis component(s) 210 may not be confidence that the detected feet are in fact feet. In such instances, the object detector 212 may attempt to identify additional regions in the image data 206 corresponding to the feet, or may await addition image data 206 that has the feet in frame.

After detecting and classifying the feet within the image data 206, the image analysis component(s) 210 may perform a confirmation step, using a multi-head network, that confirms the detection and classification (e.g., left foot 106 and right foot 108) of the feet. The multi-head network, for example, may filter out false positives (i.e., feet that were detected and classified but which are not in fact feet). The multi-head network processes, in parallel, a cropped region of the image data to confirm the detection and classification of the feet, as well as to determine the orientation of the foot. The cropped region of the image data, which is input into the multi-head network, is determined using an output of a first stage that detects and classifies the feet of the user. Such detection, or result of the first stage, indicates a region of the image data corresponding to the feet. This region is then used to define a larger region that is input into the multi-head network. The multi-head network includes suitable architecture that is able to process the cropped region in parallel, prior to rendering the item(s) on the user, to confirm the detection and classification of the feet. In some instances, the multi-head network may include three separate heads that receive the cropped region of the image data 206.

To create the cropped region, a portion of the image data 206 corresponding to the feet, respectively, may be cropped (or segmented) from a rest of the image data 206. In some instances, the image analysis component(s) 210 includes a segmentation component 222 that segments region(s) of the image data 206. For example, as part of detecting the feet of the user 102, an area (or pixels) of the feet may be determined. This may correspond to a particular location (e.g., pixels) within the image data 206 corresponding to the feet of the user 102, respectively. In some instances, the segmentation component 222 segments this area to further analyze the pixels within the area. For example, in some instances, based on the detection of the feet of the user 102 by the object detector 212, the segmentation component 222 may create a first bounding box around a first area within the image data 206 corresponding to the left foot 106, and a second bounding box around a second area within the image data 206 corresponding to the right foot 108.

In confirming the detection and/or classification of the feet, the segmentation component 222 may further take into consideration a context of the first bounding box and/or the second bounding box. For example, the segmentation component 222 may create a third bounding box around the first bounding box to analyze pixels within the image data 206 that corresponds to objects or portions of the user 102, other than the previously detected left foot 106, for example. Additionally, the segmentation component 222 may create a fourth bounding box around the second bounding box to analyze pixels within the image data 206 that corresponds to objects or portions of the user 102, other than the previously detected right foot 108. Thus, by considering areas of the image data 206 corresponding to things, objects, or the environment other than the left foot 106 and the right foot 108, the image analysis component(s) 210 may confirm the detection and classification of the left foot 106 and the right foot 108, respectively.

The segmentation component 222 may generate segmentation data 224 that identifies pixels within the bounding boxes. For example, within the bounding boxes, such as the third bounding box and the fourth bounding box, the segmentation data 224 may indicate which pixels correspond to the user 102 (e.g., the feet, legs, ankle, etc.), which pixels correspond to a background (e.g., carpet, flooring, etc.), which pixels correspond to apparel worn by the user 102 (e.g., pants, shorts, etc.), and/or which pixels correspond to other objects in the environment (e.g., furniture). In some instances, the segmentation component 222 utilizes the machine-learned model(s) 216 to identify those pixels corresponding to the user 102, the background, the apparel, and so forth. For example, the machine-learned model(s) 216, as noted above, may be trained to identify the pixels within the image data 206. In some instances, the machine-learned model(s) 216 may be trained to understand how portions of the body are interconnected for knowing or recognizing legs, ankles, feet, knees, and so forth of the user 102.

In some instances, by identifying the presence of the pixels within the image data 206 corresponding to the user 102, the background, and the apparel, the image analysis component(s) 210 may confirm the detection and classification of the left foot 106 and the right foot 108, respectively. For example, if the segmentation component 222 does not identify pixels in the bounding boxes corresponding to the leg of the user 102, the image analysis component(s) 210 may determine that a detection of the feet was incorrect. That is, as feet are connected to the leg, if the leg is not detected within the image data 206, and more specifically, the third bounding box, then the foot may have been incorrectly detected by the object detector 212. Moreover, if apparel was not identified, the foot may have been incorrectly detected as well. Here, the user 102 may be wearing pants, for example, that obstruct the leg of the user 102. If pixels within the image data 206 corresponding to the apparel were not identified, then the detection of the foot may be incorrect.

Using the bounding boxes permits the image analysis component(s) 210 to analyze a specific portion of the image data 206, as compared to an entirety of the image data 206, for use in confirming the detection of the feet. For example, at a first instance, the image data 206 may be analyzed to detect whether the feet are present. Here, the determination after the first instance may indicate whether feet were located within the image data 206, a location of the feet within the image data 206, and/or a classification of the feet (e.g., left foot 106 versus right foot 108). At a second instance, knowing the identified regions of the image data 206 corresponding to the feet, the image analysis component(s) 210 may determine whether legs and/or apparel are detected. This allows the image analysis component(s) 210 to filter out detections, after the first instance, that do not correspond to feet.

The segmentation component 222 further classifies or labels those pixels within the image data 206, or more particularly, the bounding boxes, corresponding to the feet, the background, the leg, the apparel, and so forth. As explained herein, such classification may be used when rendering footwear on the feet of the user 102. For example, to create a realistic virtual try on environment, the pixels associated with the apparel may be presented on top of pixels associated with the footwear. This permits the apparel (e.g., pants) to be disposed on top of, or over, the footwear to create a realistic impression of the user 102 wearing the footwear. Further, the classification of the pixels is used to scale or orient the footwear of the feet of the user 102.

As an additional step of the multi-head network, the detected feet may be classified. In this stage, however, the object detector 212 may analyze the cropped regions (e.g., the bounding boxes) of the image data 206 as compared to an entirety of the image data 206. By analyzing the cropped regions, the object detector 212 may once again determine whether the feet are detected. Additionally, if detected, the feet may be classified. If the feet are not detected or unable to be classified, then the apparel item(s) are refrained from being rendered on the user 102. The confirmation of the detection and classification from the bounding boxes, as well as the segmentation by the segmentation component 222, represent process that are performed in parallel and as part of the multi-head network. If the object detector is unable to detect the feet, the classifier is unable to classify the feet, or the segmentation component 222 is unable to detect the leg and/or legwear of the user 102, the item(s) are not rendered on the user 102.

The image analysis component(s) 210 are further shown including an orientation component 226. The orientation component 226 determines an orientation of the feet within the cropped region of the image data 206. In some instances, the orientation component 226 may utilize the segmentation data 224 to determine those pixels within the image data 206 corresponding to the feet of the user 102. In other instances, the orientation component 226 utilizes machine-learned model(s) that determine the orientation of the feet. The orientation of the feet may indicate how the feet are rotated, pivoted, facing, bent, and so forth. The orientation component 226 may further determine reference points of the feet, such as a big toe, small toe, heel, arch, ankle and so forth for use in determining the orientation of the foot. The reference points may assist in understanding how the feet are facing, which end of the foot is the front, back, top, bottom, and so forth. The orientation of the feet may be stored as orientation data 228.

In some instances, the orientation data 228 is used to compare a shape of the feet with an expected outline, silhouette, or shape. For example, using the orientation data 228, the image analysis component(s) 210 may access a user database 230 that includes a shape of feet for known orientations. Using the determined orientation of the foot, the image analysis component(s) 210 may access the user database 230 to determine, for the orientation of the foot, an expected shape of the foot. If the expected shape of the foot is different than the actual shape of the foot, as determined from the pixels corresponding to the foot (e.g., the segmentation component 222), the image analysis component(s) 210 may determine that the foot was incorrectly detected and/or classified. Alternatively, if the expected shape of the foot is similar to the actual shape of the foot, as determined from the pixels corresponding to the foot (e.g., the segmentation component 222), the image analysis component(s) 210 may determine that the foot was correctly detected and/or classified.

In some instances, the object detector 212, the classifier 250, the segmentation component 222, and/or the orientation component 226 generate the confidence scores 218 that are associated with the detection and classification of the feet, respectively. For example, the segmentation component 222 may generate confidence score(s) 218 that indicate a confidence that the pixels within the image data 206 correspond to the leg, background, apparel, and so forth. This may also include generating a confidence score 218 that indicates a confidence of a foot within the image data 206 representing the left foot 106 and the right foot 108, respectively. The orientation component 226, meanwhile, may generate a confidence score 218 that is associated with the orientation of the feet. In some instances, if these confidence scores 218 are less than a threshold confidence, the footwear may not be rendered on the feet of the user 102.

In instances where the feet were incorrectly detected and/or classified, the device 100 may refrain from rendering footwear on the feet of the user 102. However, in instances where feet were correctly detected and classified such as during a confirmation in the multi-head network, the device 100 may render footwear on the feet of the user 102.

In some instances, the device 100 includes a rendering component 232 that renders the footwear on the user 102 and which is displayed on the display 104. In some instances, the rendering component 232 is configured to utilize the classification of the feet, the orientation of the feet, the segmentation data 224, and so forth for rendering the footwear on the user 102.

The rendering component 232 has access to an item database 234. In some instances, the item database 234 stores image(s), model(s), or 3D representations of item(s) for try on, in this case, footwear. The item database 234 is accessed for obtaining image data of the footwear for rendering on the feet of the user 102. For example, knowing the orientation of the left foot 106 and the right foot 108 of the user 102, the rendering component 232 may select corresponding image data of footwear for rendering on the left foot 106 and the right foot 108. The item database 234 may store corresponding image(s) of the left footwear 114 and the right footwear 116, such that regardless of the orientation of the left foot 106 and the right foot 108, the rendering component is able to render the left footwear 114 and the right footwear 116 at appropriate orientations on the feet. As such, the image(s) of the footwear are from the same orientation, or viewpoint, as the left foot 106 and the right foot 108.

As part of rendering the footwear on the user 102, the rendering component 232 may further utilize the classifier data 214, the segmentation data 224, and/or the orientation data 228. This allows the rendering component 232 to render the left footwear 114 on the left foot 106 of the user 102, and the right footwear 116 on the right footwear 116 of the user 102. Additionally, such data permits the left footwear 114 and the right footwear 116 to be facing the proper direction on the left foot 106 and the right foot 108, respectively. For example, a heel of the left footwear 114 may be aligned with the heel of the left foot 106, and a toe cap of the left footwear 114 may be aligned with the toes of the left foot 106. Additionally, knowing the pixels within the image data 206 that correspond to the feet of the user 102, the left footwear 114 may be fitted or scaled to the user 102. Knowing the pixels within the image data 206 that correspond to apparel worn by the user 102 allows the apparel to be displayed over a portion of the footwear. For example, a pant cuff may be displayed over a portion of the footwear.

The computer-readable media 204 may store a client application 236, which the user 102 may use for implementing some or all of the techniques described herein. For example, the user 102 may use the client application 236 to capture image(s) of themselves as part of the virtual try on environment. In such instances, the client application 236 may instruct the user 102 as to portions of the user 102 for capturing image data 206. For example, in the event that the user 102 is trying on or shopping for footwear, the client application 236 may instruct the user 102 to capture image(s) of their feet. The client application 236 may include an application program interface (API) that interacts with other components of the device 100, such as the camera 208, for receiving the image data 206, and/or the display 104 for rendering the footwear on the feet, for example.

The API of the client application 236 may further communicate with a corresponding API of the remote computing resource(s) 200. The remote computing resource(s) 200 are shown including processor(s) 238 that perform various functions or operations associated providing or assisting in the virtual try on environment, and computer-readable media 240 storing instructions executable by the processor(s) 238 to perform the operations described herein. The remote computing resource(s) 200 are shown including a training component 242 that trains the machine-learned model(s) 216. For example, the training component 242 may train the machine-learned model(s) 216 based on training data 244. The training data 244 may indicate labels of feet, both the left foot 106 and the right foot 108, within image(s). In doing so, the training component 242 is able to train the machine-learned model(s) 216 to detect and classify feet within the image data 206. The training component 242, however, may also train the machine-learned model(s) 216 to detect other objects, things, or other item(s) that do not correspond to feet. In this sense, the machine-learned model(s) 216 may ignore those item(s) in the image data 206 unrelated or that do not correspond to the feet. In some instances, the device 100 may transmit the image data 206 to the remote computing resource(s) 200. The image data 206 may be stored in the training data 244 and used by the training component 242 to further train the machine-learned model(s) 216.

The computer-readable media 240 is further show having access to or storing an item registry 246. The item registry 246 may be associated with item(s) that are virtually tried on by the user 102. For example, the item registry 246 may store data associated with footwear (e.g., shoes, sandals, wedges, etc.), sizes of the footwear, colors of the footwear, and so forth. Further the item registry 246 may store data associated with the image(s), model(s), or representations of the item(s). For example, the item(s) may be scanned to generate a 3D model, which as discussed herein, is used to generate image(s) of the item(s) from different views. By scanning the item(s) and generating the 3D model, regardless of the viewpoint or orientation of the feet of the user 102, the item(s) may be rendered on the user 102. In some instances, the 3D model is transmitted to device 100 for use by the rendering component 232 when rendering the footwear on the feet of the user 102. For example, when trying on shoes, the remote computing resource(s) 200 may transmit the image(s), model(s), or representations of the footwear to the device 100. In turn, this allows the rendering component 232 to select an associated view of the footwear for rendering on the user 102.

The device 100 is shown communicatively coupled to the remote computing resource(s) 200 via a network 248. The network 248 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The device 100 and the remote computing resource(s) 200 may include one or more network interface(s) for permitting communication over the network 248.

In some instances, the remote computing resource(s) 200 may be implemented as one or more servers and may, in some instances, form a portion of a network-accessible computing platform implemented as a computing infrastructure of processors, storage, software, data access, etc. that is maintained and accessible via a network such as the Internet. The remote computing resource(s) 200 do not require end-user knowledge of the physical location and configuration of the system that delivers the services. Common expressions associated for the remote computing resource(s) 200 include "on-demand computing", "software as a service (SaaS)", "platform computing", "network-accessible platform", "cloud services", "data centers", etc.

The device 100 is configured to continuously capture and receive the image data 206 for rendering the footwear on the user 102. For example, the image analysis component(s) 210 may continuously analyze the image data 206, detect and/or classify the feet, and subsequently, the segmentation component 222, the classifier 250, and/or the orientation component 226 may generate the segmentation data 224, classifier data 214, and the orientation data 228, respectively, for confirming the detection and the classification of the feet. Therein the rendering component 232 may render the footwear on the feet of user 102. In such instances, the user 102 may rotate their feet to observe the footwear from different angles as part of virtually trying on the footwear. The rendering component 232 utilizes the orientation of the feet to select corresponding image(s) of the footwear for rendering on the feet. As such, the display 104 presents a real-time feed of the user 102 wearing the footwear to observe to the look of the footwear.

Although the above discussion is with regard to capturing the image data 206 of the both of the feet of the user 102, in some instances, only one of the feet of the user 102 may be present. For example, the left foot 106 of the user 102 may only be within a field of view of the camera 208. In such instances, the image analysis component(s) 210 may detect and classify the left foot 106 for rendering the left footwear 114 on the user 102. As such, the image analysis component(s) 210 may still render footwear on the user 102 corresponding to the particular foot that is detected and classified within the image data 206. For example, the user 102 may only want to see how the left footwear 114 looks, and in such instances, may only orient the camera 208 to capture image data 206 of the left foot 106.

The discussion herein relates to detecting and classifying the feet of the user 102, for example, the bare feet of the user 102. However, the feet of the user 102, or portions of the image data 206 corresponding to the feet, may be capable of being detected and classified when the user 102 is wearing socks, sandals, or other footwear. That is, the image analysis component(s) 210 are configured to determine the location of the feet or the regions within the image data 206 corresponding to the feet. In this sense, the user 102 may not be required to take off their footwear, socks, and the like for virtually trying on other footwear. The machine-learned model(s) 216, for example, may be trained to detect shoelaces, a tongue, zippers, buckles, and the like for detecting the feet (e.g., instances where the user 102 is wearing footwear).

Although the above discussion is with regard to rendering footwear, such as shoes, onto the user 102, the techniques discussed herein may be applicable to other item(s). For example, rather than rendering footwear on feet of the user 102, the rendering component 232 may render wristwear, such as a watch, on a wrist of the user 102. In such instances, the image analysis component(s) 210 may receive the image data 206 of the hands of the user 102, attempt to detect the hands, classify the hands, confirm that the hands have been properly detected and classified, and so forth. Therein, the rendering component 232 may render the wristwear on the wrist of the user 102. It is to be understood that in this scenario, the machine-learned model(s) 216, for example, may be trained to identify certain features or other portions of the user 102 (e.g., knuckles, arms, wrist, fingers, hand, etc. etc.). Still footwear other than shoes, such as sandals, heels, wedges, and so forth may be rendered on the feet of the user 102.

Although FIG. 2 illustrates certain component being located on the device 100 and certain components being located on the remote computing resource(s) 200, the device 100 may include components shown located on the remote computing resource(s) 200 and/or the remote computing resource(s) 200 may include components shown located on the device 100. Moreover, while FIG. 2 describes certain operations as being performed by the device 100 (or components thereof), in other instances, some or all of the operations may be performed by the remote computing resource(s) 200. For example, the device 100 may capture image(s) of the user 102 and then provide the image(s) to the remote computing resource(s) 200 for analysis.

As used herein, a processor, such as the processor(s) 202 and/or the processor(s) 238 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Computer-readable media, such as the computer-readable media 204 and/or the computer-readable media 240 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3-9 illustrate various processes related to providing a virtual try on environment for a user. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1 and 2, although the processes may be implemented in a wide variety of other environments, architectures, devices, and systems.

Figure 3:
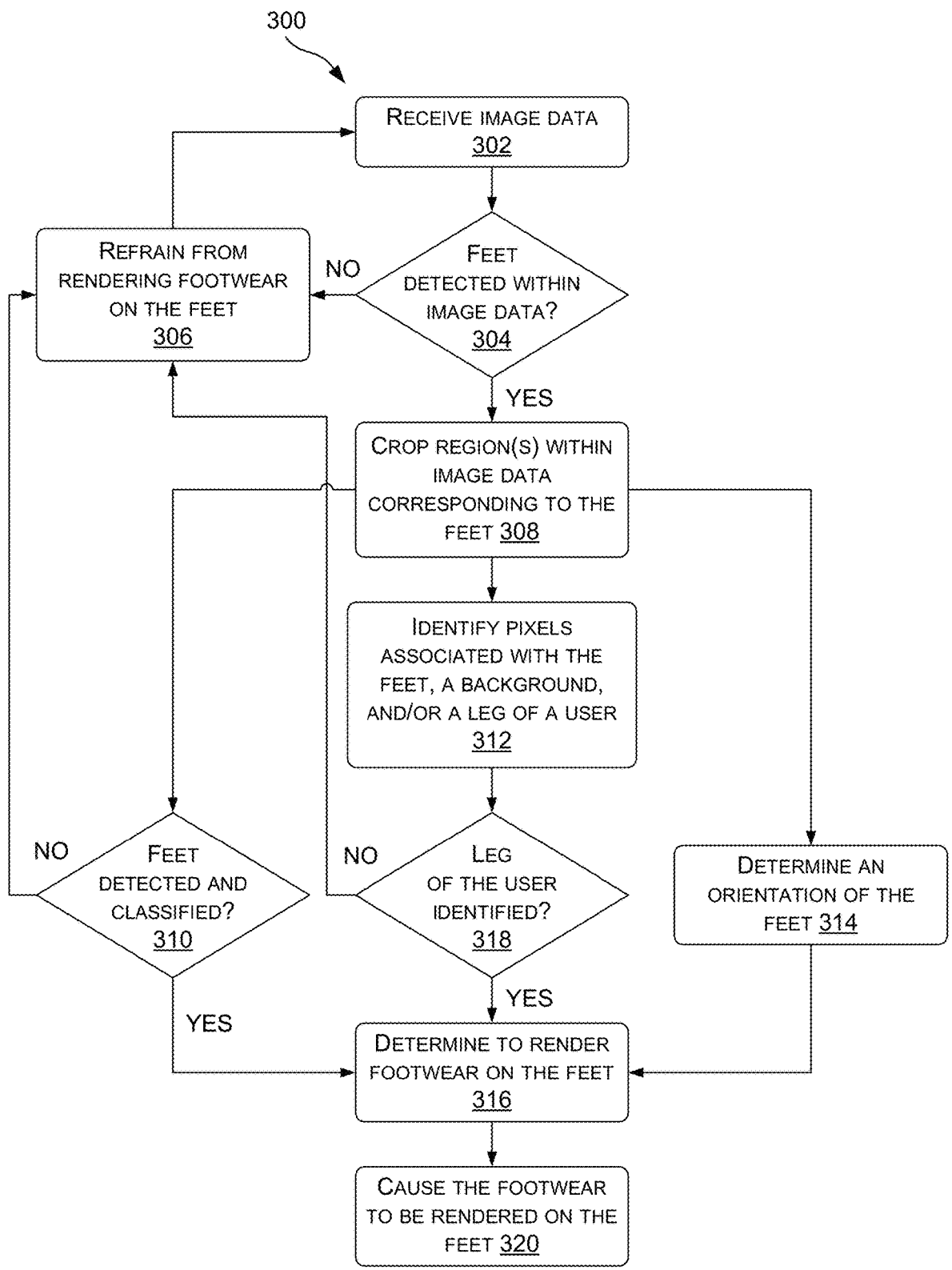
FIG. 3 illustrates an example process for presenting a virtual try on environment to a user, according to an example of the present disclosure.

FIG. 3 illustrates an example process 300 associated with rendering footwear on feet of the user 102. At 302, the process 300 may include receiving image data. For example, the camera 208 of the device 100 may capture image data 206 of the feet of the user 102. In some instances, the user 102 may hold the device 100 and orient the device 100 (or the camera 208) towards their feet. In such instances, however, the portions of the body to which the user 102 orients the device 100 may be based on item(s) for purchase by the user 102. For example, if the user 102 is shopping for wristwear (e.g., watchet), the user 102 may orient the camera 208 towards their wrist. In some instances, the device 100 may output an instruction as to the particular area or portion of the user 102 to that the user 102 is to capture image(s).

At 304, the process 300 may include determining whether feet are detected within the image data. For example, the image analysis component(s) 210 of the device 100, such as the object detector 212, may analyze the image data 206, using computer vision and/or computer processing techniques, to detect feet. In some instances, the image analysis component(s) 210 may utilize one or more machine-learned model(s) 216 for detecting the feet of the user 102. In some instances, the image analysis component(s) 210 may attempt to detect both the left foot 106 and the right foot 108 of the user 102, or may detect only one of the left foot 106 or the right foot 108. In some instances, as part of detecting the feet, or as part of determining whether the feet were detected, the image analysis component(s) 210 may classify, or otherwise attach a label to, the left foot 106 and/or the right foot 108. For example, the image analysis component(s) 210 or the classifier 250 may classify the left foot 106 in the image data 206, and/or may classify the right foot 108. In some instances, detecting the feet within the image data 206 may be based on the image analysis component(s) 210 detecting the feet with a threshold confidence. For example, an output of the machine-learned model(s) 216 may indicate the confidence score 218 that is associated with regions, areas, portions, and so forth of the image data 206 corresponding to the left foot 106 or the right foot 108. Additionally, as part of detecting the feet or after detecting, the process 300 may determine a location within the image data 206 corresponding to the feet. In some instances, the process 300 may place a bounding box around the area, location, or region in the image data 206 corresponding to the feet.

If at 304 the process 300 determines that no feet in the image data 206 were detected, the process 300 may follow the "NO" route and proceed to 306. For example, the feet of the user 102 may be absent from the image data 206 (e.g., the user 102 may not be orienting the camera 208 correctly), the image analysis component(s) 210 may not detect the feet with the threshold amount of confidence, and so forth. In instances where the image analysis component(s) 210 does not detect any feet, the rendering component 232 may refrain from transposing, displaying, or otherwise rendering the footwear on the user 102. For example, the rendering component 232 may refrain from rendering the left footwear 114 on the left foot 106 of the user 102 and/or the right footwear 116 on the right foot 108 of the user 102. From 306, the process 300 may receive additional image data 206 (e.g., loop to 302) for detecting the feet of the user 102, for example, if the user 102 moves the camera 208, the user 102 places their feet within view of the camera 208, and/or if the image analysis component(s) 210 detects other portions of the image data 206 corresponding to the feet, the image analysis component(s) 210 may detect the feet.

Alternatively, if at 304 the process 300 determines that feet were detected in the image data 206, the process 300 may follow the "YES" route and proceed to 308. At 308, the process 300 may include cropping region(s) within the image data corresponding to the feet. For example, using the location of the feet as detected in the image data 206, a corresponding portion of the image data 206 may be cropped. Cropping the portion of the image data 206 may include removing or segmenting those portions of the image data 206 detected as feet. In some instances, the cropped portion is based on the locations within the image data 206 corresponding to the feet. For example, if a first foot is detected, a corresponding portion of the image data 206 may be cropped, and/or if a second foot is detected, a corresponding portion of the image data 206 may be cropped. As discussed herein, cropping the image data 206 in this manner allows the process 300 to confirm the detection of the feet and/or the classification of the feet using a multi-head network. In some instances, the cropped portion of the image data 206 may be based on a bounding box placed around those locations in the image data 206 corresponding to the feet. The bounding box, or the regions, for example may take into consideration a context of the detected feet and allow the process 300 to analyze a specific portion of the image data 206 as compared to an entirety of the image data 206.

As shown, from 308, the process 300 may proceed to 310, 312, and 314, which may represent heads of the multi-head network used to confirm the detection and classification of the detected feet (i.e., from 304). For example, at 310, the process 300 may include determining whether the feet are detected and classified within the cropped region(s) of the image data 206. Whether the feet are detected and classified may include the image analysis component(s) 210 of the device 100, such as the object detector 212, analyzing the cropped region(s) or segmented regions of the image data 206 using computer vision and/or computer processing techniques. In some instances, the image analysis component(s) 210 may utilize one or more machine-learned model(s) 216 for detecting the feet of the user 102. In some instances, the machine-learned model(s) 216 used at 310 may be trained from instances in which feet where incorrectly detected and/or classified within the image data 206. For example, in instances where feet were detected and/or classified at the first stage, but where later determined to be incorrectly detected and/or classified, these instances are used to train the machine-learned model(s) 216. Using these use cases to train the machine-learned model(s) 216 may permit the machine-learned model(s) 216 to accurately and effectively filter out those instances in which feet were previously incorrectly detected and classified. Therefore, in future instances, the machine-learned model(s) 216 may be trained to filter out such occurrences.

In some instances, the image analysis component(s) 210 may attempt to detect both the left foot 106 and the right foot 108 of the user 102, or may detect only one of the left foot 106 or the right foot 108. In some instances, as part of detecting the feet, or as part of determining whether the feet were detected, the image analysis component(s) 210 may classify, or otherwise attach a label to, the left foot 106 and/or the right foot 108. For example, the image analysis component(s) 210 or the classifier 250 may classify the left foot 106 in the image data 206, and/or may classify the right foot 108. In some instances, detecting the feet within the image data 206 may be based on the image analysis component(s) 210 detecting the feet with a threshold confidence. As compared to 304, however, the process at 310 crops the region(s) of the image data 206 previous determined to be associated with the feet, and then analyzes the cropped region to determine whether the feet are detected and classified. Determining the classifications of the feet permits the left footwear 114 and the right footwear 116 to be correctly rendered on the left foot 106 and the right foot 108 of the user 102, respectively.

If at 310 the process determines that feet are not detected and/or are not classifiable, the process 300 may follow the "NO" route and proceed to 306. Alternatively, if the process 300 determines that the feet are detected and classified, the process 300 may follow the "YES" route and proceed to 316 (which is discussed herein).

At 312, the process 300 may include identifying pixels associated with the feet, a background, and/or a leg of the user. For example, the image analysis component(s) 210 may identify within the cropped regions of the image data 206, first pixels corresponding to the feet (e.g., the left foot 106 and/or the right foot 108), second pixels corresponding to the background, and/or third pixels corresponding to the leg(s) of the user 102. In some instances, identifying the first pixels, the second pixels, and/or the third pixels may be based on using the machine-learned model(s). For example, the machine-learned model(s) 216 may analyze the pixels of the image data 206 within the bounding boxes, or the cropped regions, to detect color, depth, shapes, contours, and the like for associating pixels with the feet, the background, and the leg(s), respectively. Segmenting such pixels from a rest of the image data 206 may also involve determining other objects in the image data 206 (e.g., remote, table, etc.) for knowing that such objects do not correspond to the feet, the background, and/or the leg(s).

At 318, the process 300 may include determining whether the leg of the user is identified. For example, based on identifying the pixels of the feet, the background, and the leg, the image analysis component(s) 210 may determine whether the leg is present in the image data 206, or whether pixels within the cropped regions have been identified as corresponding to the leg. In some instances, this may include a determination of whether a left leg is detected and classified with the left foot 106, and/or whether a right leg is detected and classified with the right foot 108. In this sense, in order for the left foot 106 to be accurately detected, the image analysis component(s) 210 determines whether the left leg is present. Additionally, in order for the right foot 108 to be accurately detected, the image analysis component(s) 210 determines whether the right leg is present. This filters instances in which the left foot 106 and/or the right foot 108 were initially detected at 304, but after further analysis, the left foot 106 and/or the right foot 108 were determined to be absent or corresponding to non-feet objects. As such, the confirmation improves an accuracy in detecting and classifying the left foot 106 and the right foot 108 of the user 102.

If at 318, the process 300 determines that the leg of the user 102 was not identified, the process 300 may follow the "NO" route and proceed to 306. In some instances, the process 300 may proceed to 306 in instances where the left leg and/or the right leg were not identified in the image data 206. As such, the process 300 may refrain from rendering the footwear on objects within image data 206 not corresponding to the feet, or in instances where the feet were not identified. Alternatively, if the leg was identified the process 300 may follow the "YES" route and proceed to 316.

At 314, the process 300 may include determining an orientation of the feet. For example, the orientation component 226 may determine directions the feet are pointing within the cropped regions of the image data 206. In some instances, to determine the orientation of the feet, reference points of the feet may be identified. For example, a heel, toe, sides, archway, and the like of the feet may be identified. Such reference points may indicate which way the left foot 106 and/or the right foot 108 are facing. Moreover, the reference points may be used to indicate how the user 102 is positioning the left foot 106 and the right foot 108, respectively (e.g., bent, rotated, etc.). Determining the orientation of the feet permits the footwear to be correctly rendered on the left foot 106 and the right foot 108 of the user 102, respectively.

At 316, the process 300 may include determining to render footwear on the feet of the user. In some instances, the process 300 may proceed to 316 after the feet are detected and classified at 310, the leg of the user 102 is identified at 318, and the orientation of the feet is determined at 314. In such instances, the steps 310, 312, and 314 may be performed in parallel and proceed to 316. For example, the operations 310-314 may represent different heads of the multi-head network that receive the cropped region of the image data 206. The cropped region of the image data 206 is determined as an output from a first stage (e.g., 302 and 304). That is, the cropped region of the image data 206 is determined using an output of the first stage, which indicates a region of the image data corresponding to the feet. This region is then used to define a larger region that is input into the multi-head network. The multi-head network therefore serves to process, in parallel, a cropped region of the image data to confirm the detection and classification of the feet, as well as to determine the orientation of the foot. The multi-head network includes suitable architecture that is able to process the cropped region in parallel, prior to rendering the item(s) on the user, to confirm the detection and classification of the feet.

Determining to render the footwear on the user 102, may therefore, occur after the feet are detected and classified at 310, the leg of the user 102 is identified at 318, and the orientation of the feet is determined at 314.

At 320, the process 300 may include causing the footwear to be rendered on the feet. For example, the rendering component 232 may display image data of the left footwear 114 on the left foot 106 of the user 102, and/or image data of the right footwear 116 on the right foot 108 of the user 102. The device 100 may store or otherwise have access to the item database 234, which stores a 3D model or image(s) of the left footwear 114 and the right footwear 116. By determining the orientation of the left foot 106 and the right foot 108, the rendering component 232 may determine associated renderings of the left footwear 114 and the right footwear 116. Here, the left footwear 114 and/or the right footwear 116 may be accurately and realistically displayed on (e.g., on top of) the left foot 106 and/or the right foot 108 of the user 102.

Although the process 300 describes determining whether the feet of the user were identified, the process 300 may determine whether any feet of the user 102, whether the left foot 106 or the right foot 108 of the user 102 were identified. If so, the process 300 may include rendering an appropriate footwear on the left foot 106 or the right foot 108 of the user 102. Further, the techniques discussed herein may be applied to other item(s) and/or portions of the user 102. For example, the image analysis component(s) 210 may be used to identify hands of the user 102, and render wristwear on the hands of the user 102 (e.g., watch).

Figure 4:
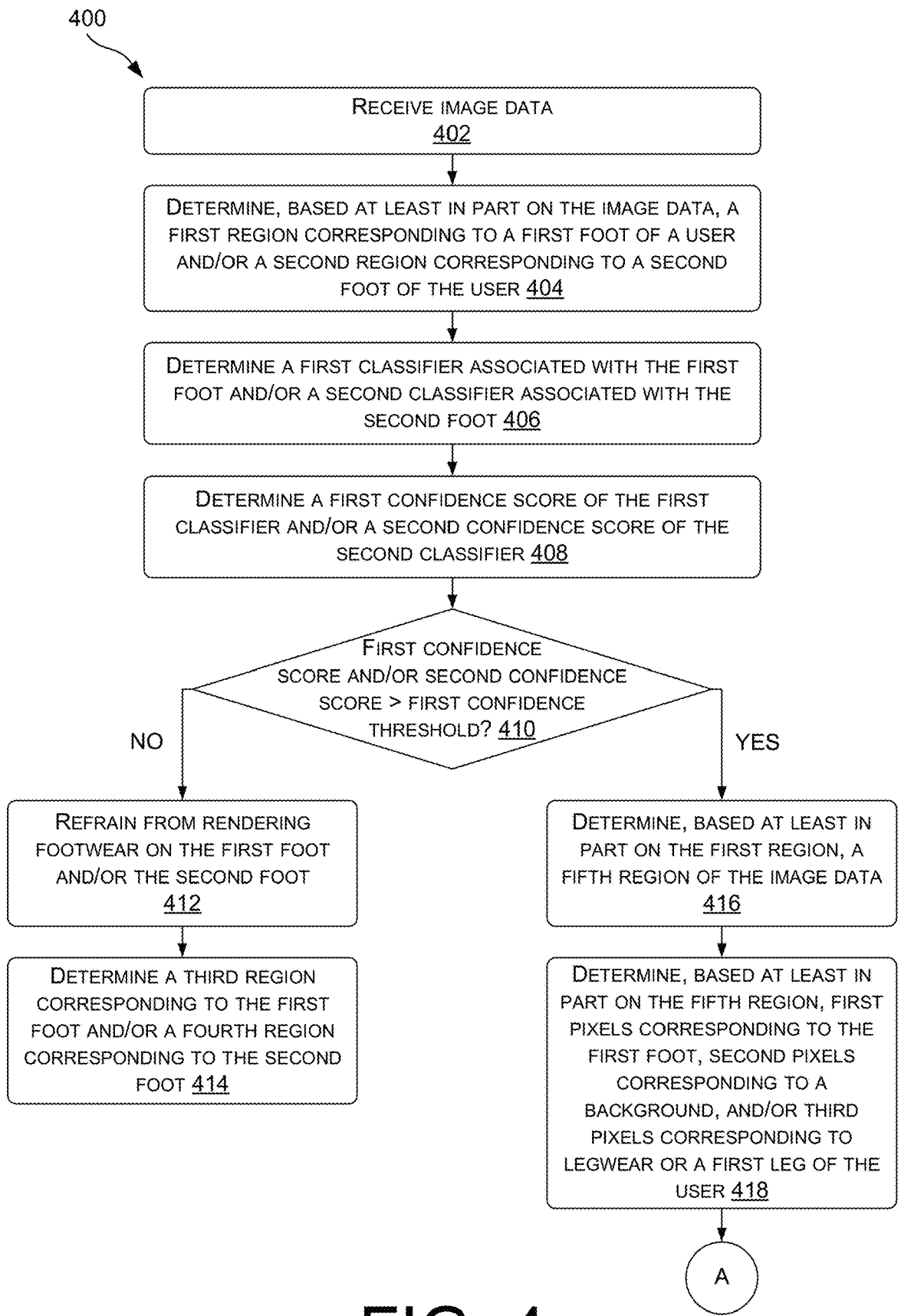
FIG. 4 illustrates an example process for presenting a virtual try on environment to a user, according to an example of the present disclosure.

FIG. 4 illustrates an example process 400 for detecting and classifying feet of the user 102 within image data 206 and causing footwear to be rendered on the feet of the user 102.

At 402, the process 400 may include receiving image data. For example, the camera 208 of the device 100 may capture the image data 206. In some instances, the user 102 may hold the device 100 and orient the device 100 (or the camera 208) towards their feet. In such instances, however, the portions of the body to which the user 102 orients the device 100 may be based on item(s) for purchase by the user 102. For example, if the user 102 is shopping for wristwear (e.g., watchet), the user 102 may orient the camera 208 towards their wrist. In some instances, the device 100 may output an instruction as to the particular area or portion of the user 102 to that the user 102 is to capture image(s).

At 404, the process 400 may include determining, based at least in part on the image data, a first region corresponding to a first foot of a user and/or a second region corresponding to a second foot of the user. For example, the image analysis component(s) 210, using the object detector 212, may attempt to detect feet of the user 102 within the image data 206. This may include, in some instances, using machine-learned model(s) 216 that are trained to detect and locate feet within image(s). For example, the machine-learned model(s) 216 may detect the feet based on shape, size, orientation, other reference points (e.g., leg, ankle, toes, etc.), and so forth. Determining the first region corresponding to the first foot may involve determining pixels of the image data 206 that correspond to the first foot. In some instances, a bounding box may represent the first region, where pixels within the first region correspond to the first foot. In this instance, the pixels within the first region (or a portion thereof) may be identified as the first foot. The object detector 212 may determine the location of the first foot, or indicate the location of the first foot, using the bounding box. Likewise, determining the second region corresponding to the second foot may involve determining pixels of the image data 206 that correspond to the second foot. In some instances, a bounding box may represent the second region, where pixels within the second region correspond to the second foot. In this instance, the pixels within the second region (or a portion thereof) may be identified as the second foot.

However, both the first foot and the second foot need not be detected within the image data 206. For example, only one of the first foot or the second foot may be identified, or neither of the feet may be identified. At this point, the process 400 may detect objects or regions of the image data 206 that appear to be associated with feet.

At 406, the process 400 may include determining a first classifier associated with the first foot and/or a second classifier associated with the second foot. For example, the image analysis component(s) 210, using the classifier 250, may determine whether the first foot (if present) corresponds to the left foot 106 of the user 102 or the right foot 108 of the user 102. Additionally, the image analysis component(s) 210, using the classifier 250, may determine whether the second foot (if present) corresponds to the left foot 106 of the user 102 or the right foot 108 of the user 102. In some instances, the image analysis component(s) 210 may utilize the machine-learned model(s) 216 to determine which of the detected feet correspond to the left foot 106 and the right foot 108, respectively. For example, the machine-learned model(s) 216 may analyze a shape of the foot, a shape of a sock, a shape of a piece of footwear on the feet. For purposes of the discussion of the process 400, the first foot at 406 may be identified as the left foot 106, and/or the second foot at 406 may be identified as the right foot 108. However, it is to be understand that the left foot 106 and/or the right foot 108 may be absent, or not identified, in the image data 206.

At 408, the process 400 may include determining a first confidence score of the first classifier and/or a second confidence score of the second classifier. For example, the confidence scores 218 may indicate the first confidence score and the second confidence score. The confidence scores 218 may be determined by the machine-learned model(s) 216. Here, the image data 206 may be input the machine-learned model(s) 216 and the machine-learned model(s) 216 may output the confidence scores 218. Generally, the confidence scores 218 represent a confidence of the feet being detected and classified. For example, the confidence scores 218 may indicate a likelihood, probability, or confidence of the first foot corresponding to the left foot 106, and may indicate a likelihood, probability, or confidence of the second foot corresponding to the right foot 108.

At 410, the process 400 may include determining whether the first confidence score and/or the second confidence score is greater than a first confidence threshold. For example, the first confidence score and/or the second confidence score may be compared against the first confidence threshold. The first confidence threshold may be stored in the threshold data 220 and indicate a threshold confidence to be satisfied. For example, the threshold confidence may be 80%, 90%, 95%, and so forth. That is, if the first foot is classified as the left foot 106, and the first confidence score is 80%, this first confidence score may be compared against the first confidence threshold. If the first confidence score is less than the first confidence threshold, the first confidence score may not satisfy the first confidence threshold. The same process may repeat for the second confidence score and determining whether the second confidence score satisfies the first confidence threshold.

Comparison of the first confidence score and the second confidence score to the first confidence threshold is used to avoid scenarios where footwear is rendered on items or objects in the image data 206 (or the environment) that do not correspond to the feet of the user 102. Such instances or occurrences may detract from an experience of the user 102. Accordingly, if at 410 the process 400 determines that the first confidence score and/or the second confidence score is not greater than the first confidence threshold, or does not satisfy the first confidence threshold, the process 400 may follow the "NO" route and proceed to 412. In some instances, the process 400 may proceed to 412 if the first confidence score and/or the second confidence score do not satisfy the first confidence threshold. For example, the first confidence score may satisfy the first confidence threshold, but the second confidence score may not satisfy the first confidence threshold.

At 412, the process 400 may refrain from rendering footwear on the first foot and/or the second foot. For example, if the image analysis component(s) 210 is not confident in the classification of the feet, or has not detected feet, the rendering component 232 may refrain from rendering the left footwear 114 on the left foot 106 and/or the right footwear 116 on the right foot 108. In some instances, when the first confidence score satisfies the first confidence threshold, but the second confidence score does not satisfy the first confidence threshold, the process 400 may render the left footwear 114 on the left foot 106 of the user 102, but may refrain from rendering the right footwear 116 on the right foot 108 of the user 102. Alternatively, when the first confidence score satisfies the first confidence threshold, but the second confidence score does not satisfy the first confidence threshold, the process 400 may refrain from rendering the left footwear 114 on the left foot 106 of the user 102.

At 414, the process 400 may include determining a third region corresponding to the first foot and/or a fourth region corresponding to the second foot. For example, the image analysis component(s) 210 may attempt to reanalyze the image data 206 to detect other regions within the image data 206 that potentially contain or represent the feet. For example, regions of the image data 206 that were previously ignored, or associated with other objects, may in fact include the feet and the image analysis component(s) 210 may attempt to reanalyze the image data 206 for detecting the feet. In other instances, additional image data 206 may be captured an input into the machine-learned model(s) 216 for identifying the feet. From 414, the process 400 may analyze the image data 206 for determining regions of the feet, determining confidence scores 218 associated with the classifications of the feet, and then determining whether the confidence scores 218 satisfy the first confidence threshold.

Returning to 410, if at 410 the process 400 determines that the first confidence score and/or the second confidence score are greater than the first confidence threshold, the process 400 may follow the "YES" route and proceed to 416. At 416, the process 400 may include determining, based at least in part on the first region, a fifth region of the image data. For example, based on determining the first region of the image data 206 corresponding to the first foot (e.g., the left foot 106), which may include a bounding box, the process 400 may determine a fifth region that surrounds the first region. Here, the fifth region may include another bounding box that surrounds the bounding box of the first region. The fifth region may therefore be based on the first region, or a location of the first region within the image data 206. As explained herein, the fifth region may be used to consider a context of the first region within the image data 206. In some instances, the fifth region may also be used to segment a corresponding portion of the image data 206 for further analysis. In other words, the fifth region may be cropped from the image data 206.

At 418, the process 400 may include determining, based at least in part on the fifth region, first pixels corresponding to the first foot, second pixels corresponding to a background, and third pixels corresponding to legwear and/or a first leg of the user. For example, using the fifth region as cropped from the image data, and pixels identified within the fifth region, the segmentation component 222 may identify those pixels within the fifth region that correspond to the first foot, the background, and the clothing and/or the first leg of the user 102, respectively. In some instances, the segmentation component 222 may utilize the machine-learned model(s) 216 to identify the pixels associated with the first foot, the background, and the legwear and/or the first leg of the user 102, respectively. For example, the fifth region of the image data 206 may be input into the machine-learned model(s) 216. As an output, the machine-learned model(s) 216 may identify those pixels that correspond to the feet, the background, and the legwear and/or the first leg of the user 102. In turn, the segmentation component 222 may store indications of the pixels within the fifth region that correspond to the first foot, the background, and the legwear and/or the first leg of the user 102, respectively.

In some instances, the first foot, the background, and/or the legwear and/or the first leg of the user 102 may not be identifiable within the fifth region, and in such instances, indications of such may be stored in the segmentation data 224. The segmentation component 222 is also configured to detect the first leg in instances where the user 102 is not wearing legwear, or the legwear in instances where the user 102 is wearing legwear. From 418, the process 400 may continue to "A," which is discussed in FIG. 5.

Figure 5:
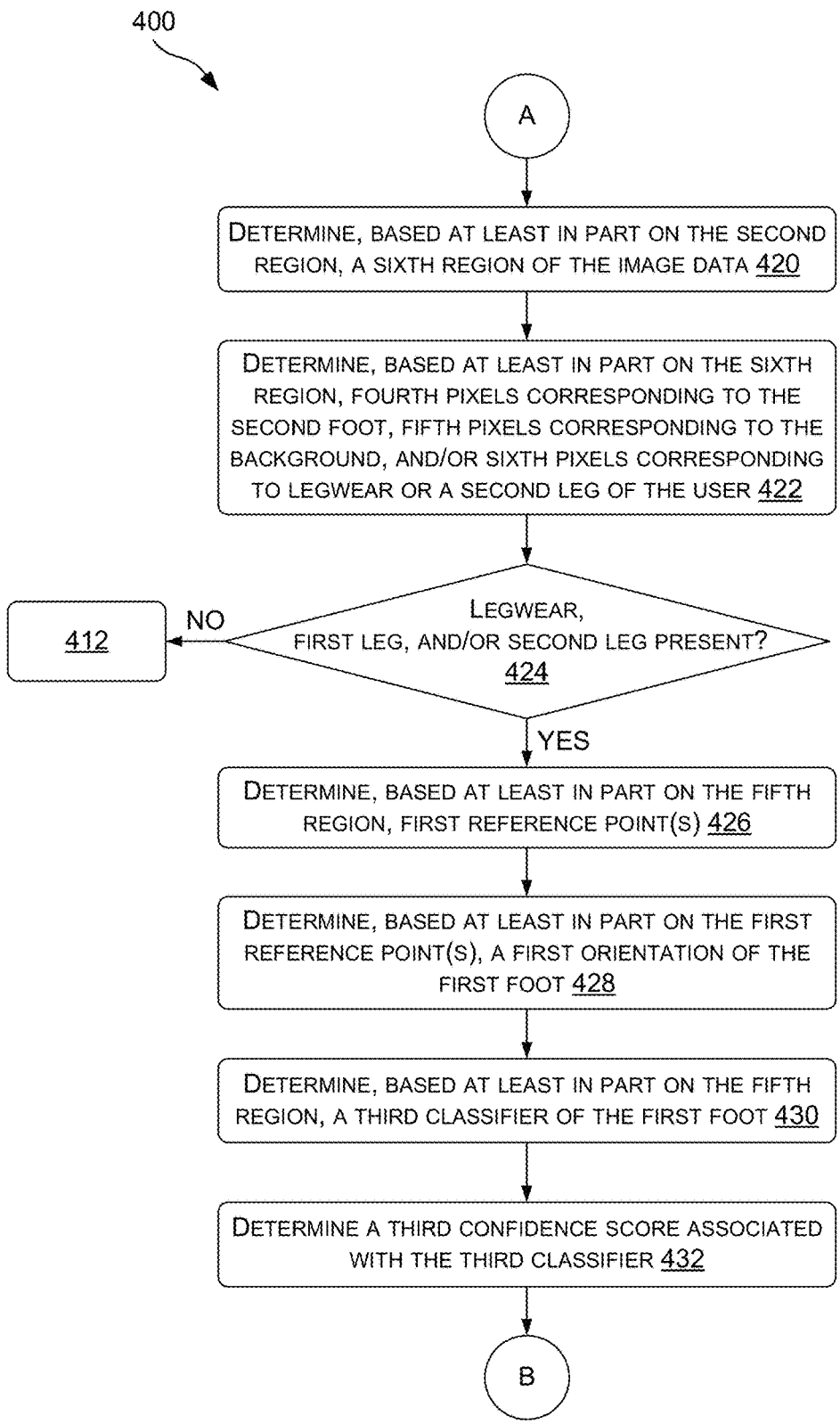
FIG. 5 illustrates a continuation of the process of FIG. 4, according to an example of the present disclosure.

FIG. 5 illustrates a continuation of the process 400 introduced in FIG. 4. For example, from "A" the process 400 may proceed to 420.

At 420, the process 400 may include determining, based at least in part on the second region, a sixth region of the image data. For example, based on determining the second region of the image data 206 corresponding to the second foot (e.g., the right foot 108), which may include a bounding box, the process 400 may determine a sixth region that surrounds the second region. Here, the sixth region of the image data 206 may include another bounding box that surrounds the bounding box of the second region. In this sense, the sixth region may be based at least in part on the second region, or a location of the second region within the image data 206. As explained herein, the sixth region may be cropped from the image data 206 and used to consider a context of the second region within the image data 206. In some instances, the sixth region may also be used to segment a corresponding portion of the image data 206 for further analysis.

At 422, the process 400 may include determining, based at least in part on the sixth region, fourth pixels corresponding to the second foot, fifth pixels corresponding to the background, and sixth pixels corresponding to legwear and/or a second leg of the user. For example, using the sixth region and pixels identified within the sixth region, the segmentation component 222 may identify those pixels within the sixth region that correspond to the second foot, the background, and the clothing and/or the second leg of the user 102, respectively. In some instances, the segmentation component 222 may utilize the machine-learned model(s) 216 to identify the pixels associated with the second foot, the background, and the legwear and/or the second leg of the user 102, respectively. For example, the sixth region may be input into the machine-learned model(s) 216, and as an output, the machine-learned model(s) 216 may output indications of those pixels within the sixth region that correspond to the second foot, the background, and the clothing and/or the second leg of the user 102, respectively. In turn, the segmentation component 222 may store indications of the pixels within the sixth region that correspond to the second foot, the background, and the legwear and/or the second leg of the user 102, respectively. In some instances, the second foot, the background, and/or the legwear and/or the second leg of the user 102 may not be identifiable within the sixth region, and in such instances, indications of such may be stored in the segmentation data 224. The segmentation component 222 is configured to identify the second leg in instances where the user 102 is not wearing legwear, or the legwear in instances where the user 102 is wearing legwear.

At 424, the process 400 may include determining whether the legwear, the first leg, and/or the second leg are present. For example, determining whether the legwear, the first leg, and/or the second leg are present may serve as a confirmation of the first foot and/or the second foot being identified within the image data 206. To determine such confirmation, the process 400 may utilize the pixels identified within the fifth region and the sixth region. For example, the image analysis component(s) 210 may determine whether there were third pixels in the fifth region corresponding to the legwear and/or the first leg of the user 102. Additionally, or alternatively, the image analysis component(s) 210 may determine whether there were sixth pixels in the sixth region corresponding to the legwear and/or the second leg of the user 102. Such determination may be made if the classifier 250 has labeled the pixels, via the classifier data 214. If the third pixels and the sixth pixels were not identified, respectively, this may be indicative of an error in detecting the first foot and/or the second foot previously. For example, for the first foot and the second foot to be correctly detected and labeled, a corresponding leg is adjoined to the foot. In instances where the user 102 is wearing legwear, the leg is detected and associated with such legwear. As such, if pixels in the fifth region and the sixth region were not identified as corresponding to the legwear, the first leg, or the second leg, respectively, the first foot and/or the second foot may have been incorrectly detected and/or classified within the image data 206. Upon such determination, the process 400 may follow the "NO" route and proceed to 412 (FIG. 4) and refrain from rendering footwear on the first foot and/or the second foot. Alternatively, if the legwear, the first leg, and/or the second leg were detected within the fifth region and the sixth region, respectively, the process 400 may follow the "YES" route and proceed to 426.

At 426, the process 400 may include determining, based at least in part on the fifth region, first reference point(s). For example, the image analysis component(s) 210 may determine reference point(s) associated with the first foot. In some instances, the first reference point(s) may indicate where a heel of the first foot is located, where toes of the first foot are located, where a big toe or a small toe of the first foot is located, where an arch of the first foot is located, and so forth. In some instances, the first reference point(s) are determined based on analyzing the first pixels (as determined from the segmentation component 222) associated with the first foot. Alternatively, the fifth region of the image data 206 may be input into the machine-learned model(s) 216 and the machine-learned model(s) 216 may output an indication of the first reference points. The first reference points may also be classified, by the classifier 250, within classifier data 214.

At 428, the process 400 may include determining, based at least in part on the first reference point(s), a first orientation of the first foot. For example, using the first reference point(s), the image analysis component(s) 210 (e.g., the orientation component 226) may determine the first orientation of the first foot. In some instances, the first orientation is associated with a directionality of the first foot, how the first foot is positioned, angled, bent, and so forth. The first orientation may also indicate in which direction the first foot is facing. Such orientation, for example, may be determined based on knowing where the heel and the toes of the first foot are located.

At 430, the process 400 may include determining, based at least in part on the fifth region, a third classifier of the first foot. For example, the fifth region of the image data 206 may be input into the machine-learned model(s) 216 for determining whether the first foot is detected and classified. This is in comparison to the detection at 406 when an entirety of the image data 206 was utilized to determine whether the foot was detected. Instead, at 430, the process 400 serves to filter out false positives of the first foot being detected by analyzing the fifth region of the image data. In other words, the image analysis component(s) 210 may determine a classifier of the first foot using the cropped or segmented region of the image data 206 (e.g., the fifth region). The classifier 250, for example, may indicate whether the first foot corresponds to the left foot 106 or the right foot 108 of the user 102. Additionally, if the classifier 250 is unable to detect and/or classify the first foot, then the first foot may be determined to be absent from the fifth region. That is, even though the first foot may have been previously identified as the left foot 106, the process 400 may determine the third classifier for confirming the classifier of the first foot.

At 432, the process 400 may include determining a third confidence score associated with the third classifier. For example, in some instances, the machine-learned model(s) 216 may determine the third confidence score. For example, the machine-learned model(s) 216 may receive the fifth region of the image data 206 as an input, and output an indication of the classifier as well as a confidence of the classifier. For example, the third confidence score may indicate a confidence that the first foot corresponds to the left foot 106 or the right foot 108. From 432, the process 400 may continue to "B," which is discussed in FIG. 6.

Figure 6:
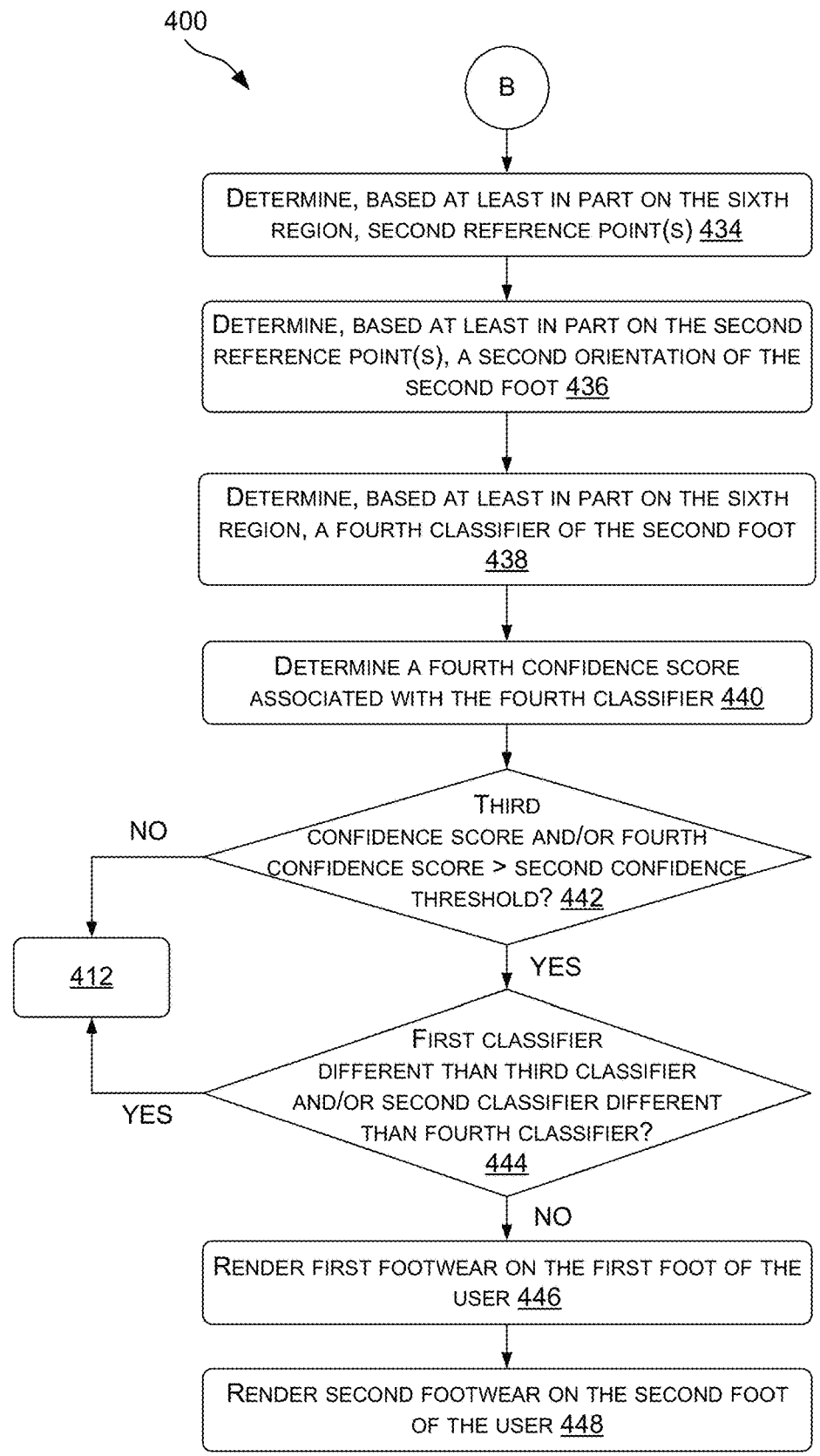
FIG. 6 illustrates a continuation of the process of FIGS. 4 and 5, according to an example of the present disclosure.

FIG. 6 illustrates a continuation of the process 400 introduced in FIGS. 4 and 5. For example, from "B" the process 400 may proceed to 434.

At 434, the process 400 may include determining, based at least in part on the sixth region, second reference point(s). For example, the image analysis component(s) 210 may determine reference point(s) associated with the second foot. In some instances, the second reference point(s) may indicate where a heel of the second foot is located, where toes of the second foot are located, where a big toe or a small toe of the second foot is located, where an arch of the second foot is located, and so forth. In some instances, to determine the second reference points, the sixth region of the image data 206 is input into the machine-learned model(s) 216 and outputs the second reference point(s).

As 436, the process 400 may include determining, based at least in part on the second reference point(s), a second orientation of the second foot. For example, using the second reference point(s), the image analysis component(s) 210 (e.g., the orientation component 226) may determine the second orientation of the second foot. In some instances, the second orientation is associated with a directionality of the second foot, how the second foot is positioned, angled, bent, and so forth. The second orientation may also indicate in which direction the second foot is facing. Such orientation, for example, may be determined based on knowing where the heel and the toes of the second foot are located.

At 438, the process 400 may include determining, based at least in part on the sixth region, a fourth classifier of the second foot. For example, the sixth region of the image data 206 may be input into the machine-learned model(s) 216 for determining whether the second foot is detected and classified. This is in comparison to the detection at 406 when an entirety of the image data 206 was utilized to determine whether the foot was detected. Instead, at 438, the process 400 serves to filter out false positives of the second foot being detected by analyzing the sixth region of the image data 206. In other words, the image analysis component(s) 210 may determine a classifier of the second foot using the cropped or segmented region of the image data 206 (e.g., the sixth region). The classifier 250, for example, may indicate whether the second foot corresponds to the left foot 106 or the right foot 108 of the user 102. Additionally, if the classifier 250 is unable to detect and/or classify the second foot, then the second foot may be determined to be absent from the sixth region. That is, even though the second foot may have been previously identified as the right foot 108, the process 400 may determine the fourth classifier for confirming the classifier of the second foot.

At 440, the process 400 may include determining a fourth confidence score associated with the fourth classifier. For example, in some instances, the machine-learned model(s) 216 may determine the fourth confidence score. For example, the machine-learned model(s) 216 may receive the sixth region of the image data 206 as an input, and output an indication of the classifier as well as a confidence of the classifier. For example, the fourth confidence score may indicate a confidence that the second foot corresponds to the left foot 106 or the right foot 108.

At 442, the process 400 may include determining whether the third confidence score and/or the fourth confidence score are greater than a second confidence threshold. For example, the third confidence score and/or the fourth confidence score may be compared against the second confidence threshold. The second confidence threshold may be stored in the threshold data 220, and indicate, a threshold confidence that is to be satisfied. For example, the second threshold confidence may be 80%, 90%, 95%, and so forth. That is, if the first foot is classified as the left foot 106, and the third confidence score is 90%, this third confidence score may be compared against the second confidence threshold. If the third confidence score is less than the second confidence threshold, the third confidence score may not satisfy the second confidence threshold. The same process may repeat for the fourth confidence score and determining whether the fourth confidence score satisfies the second confidence threshold. Comparison of the confidence scores and the second confidence score to the second confidence threshold is used to avoid scenarios where footwear is rendered on items or objects in the image data 206 (or the environment) that do not correspond to the feet of the user 102.

If at 442 the process 400 determines that the third confidence score and/or the fourth confidence score is not greater than the second confidence threshold, or does not satisfy the second confidence threshold, the process 400 may follow the "NO" route and proceed to 412. Alternatively, if at 442 the process 400 determines that the third confidence score and/or the fourth confidence score are greater than the second confidence threshold, the process 400 may follow the "YES" route and proceed to 444.

At 444 the process 400 may include determining whether the first classifier is different than the third classifier and/or whether the second classifier is different than the fourth classifier. For example, the first classifier may be compared against the third classifier, and the second classifier may be compared against the fourth classifier. If the classifier are the same, respectively, this may indicate a confirmation that the feet, on separate occasions, were identified as the same foot. Alternatively, if the classifiers are different, this may indicate a lack of confirmation, or a discrepancy, in classifying the feet. If at 444 the process 400 determines that the first classifier is different than the third classifier and/or that the second classifier is different than the fourth classifier, the process 400 may follow the "YES" route and proceed to 412. Alternatively, if at 444 the process 400 determines that the first classifier is the same as the third classifier and/or that the second classifier is the same as the fourth classifier, the process 400 may follow the "NO" route and proceed to 446.

In some instances, certain operations between 416 and 444 may be performed in parallel. For example, upon determining the fifth region of the image data 206, the process 400 may segment the pixels to determine whether the legwear and the first leg are present, the process 400 may determine the first orientation of the first foot, and the process 400 may classify the first foot detected within the image data 206. In other words, the operations 418 and 424 may be performed in parallel with 426 and 428, as well as 430, 442, and 444. These separate operations serve to, in parallel, filter out false positives in which the feet are detected. That is, if the legwear and/or first leg is not detected, the orientation of the first foot is not determined, and/or the first foot is not classified, the process 400 may refrain from rendering the footwear on the user 102. In these instances, however, the process 400 utilizes the fifth region of the image data 206 to determine whether the first leg and/or first legwear is detected, the orientation, and the classification of the first foot. This part of the process 400 is therefore considered a multi-head network that processes the cropped region of the image data 206. The cropped region of the image data 206 is determined as an output from a first stage, which indicates a region of the image data 206 corresponding to the feet. This region is used to define a larger region that is input into the multi-head network. The multi-head network serves to process, in parallel, the cropped region of the image data 206 to confirm the detection and classification of the feet, as well as to determine the orientation of the foot.

The same is true for the detecting the second foot. For example, upon determining the sixth region of the image data 206, the process 400 may segment the pixels to determine whether the legwear and the second leg are present, the process 400 may determine the second orientation of the second foot, and the process 400 may classify the second foot detected within the image data 206. In other words, the operations 418 and 424 may be performed in parallel with 434-436 and 438-444. These separate operations serve to, in parallel, filter out false positives in which the feet are detected. That is, if the legwear and/or second leg is not detected, the orientation of the second foot is not determined, and/or the second foot is not classified, the process 400 may refrain from rendering the footwear on the user 102. In these instances, however, the process 400 utilizes the sixth region of the image data 206 to determine whether the second leg and/or second legwear is detected, the orientation, and the classification of the second foot.

At 446, the process 400 may include rendering first footwear on the first foot of the user 102. For example, the rendering component 232 may display image data of the left footwear 114 on the left foot 106 of the user 102. The rendering component 232 may store or otherwise have access to the item database 234, which stores a 3D model or image(s) of the left footwear 114. Using the orientation of the left foot 106, the first reference point(s), and/or the first classifier/the third classifier, the rendering component 232 may determine associated renderings of the left footwear 114. Here, the left footwear 114 may be accurately and realistically displayed on (e.g., on top of) the left foot 106 of the user 102.

At 448, the process 400 may include rendering second footwear on the second foot of the user 102. For example, the rendering component 232 may display image data of the right footwear 116 on the right foot 108 of the user 102. The rendering component 232 may store or otherwise have access to the item database 234, which stores a 3D model or image(s) of the right footwear 116. Using the orientation of the right foot 108, the second reference point(s), and/or the second classifier/the fourth classifier, the rendering component 232 may determine associated renderings of the right footwear 116. Here, the right footwear 116 may be accurately and realistically displayed on (e.g., on top of) the right foot 108 of the user 102.

Although the process 400 is described as determining whether two feet of the user 102 are present for rendering the left footwear 114 and the right footwear 116, respectively, the process 400 may, in some instances, only render one of the left footwear 114 or the right footwear 116. In such instances, the process 400 may only detect one of the feet of the user 102 and may display corresponding footwear of the foot of the user 102. Here, for example, the left foot 106 of the user 102 may only be captured within the image data 206, and the user 102 may desire to only virtually try on the left footwear 114.

Figure 7:
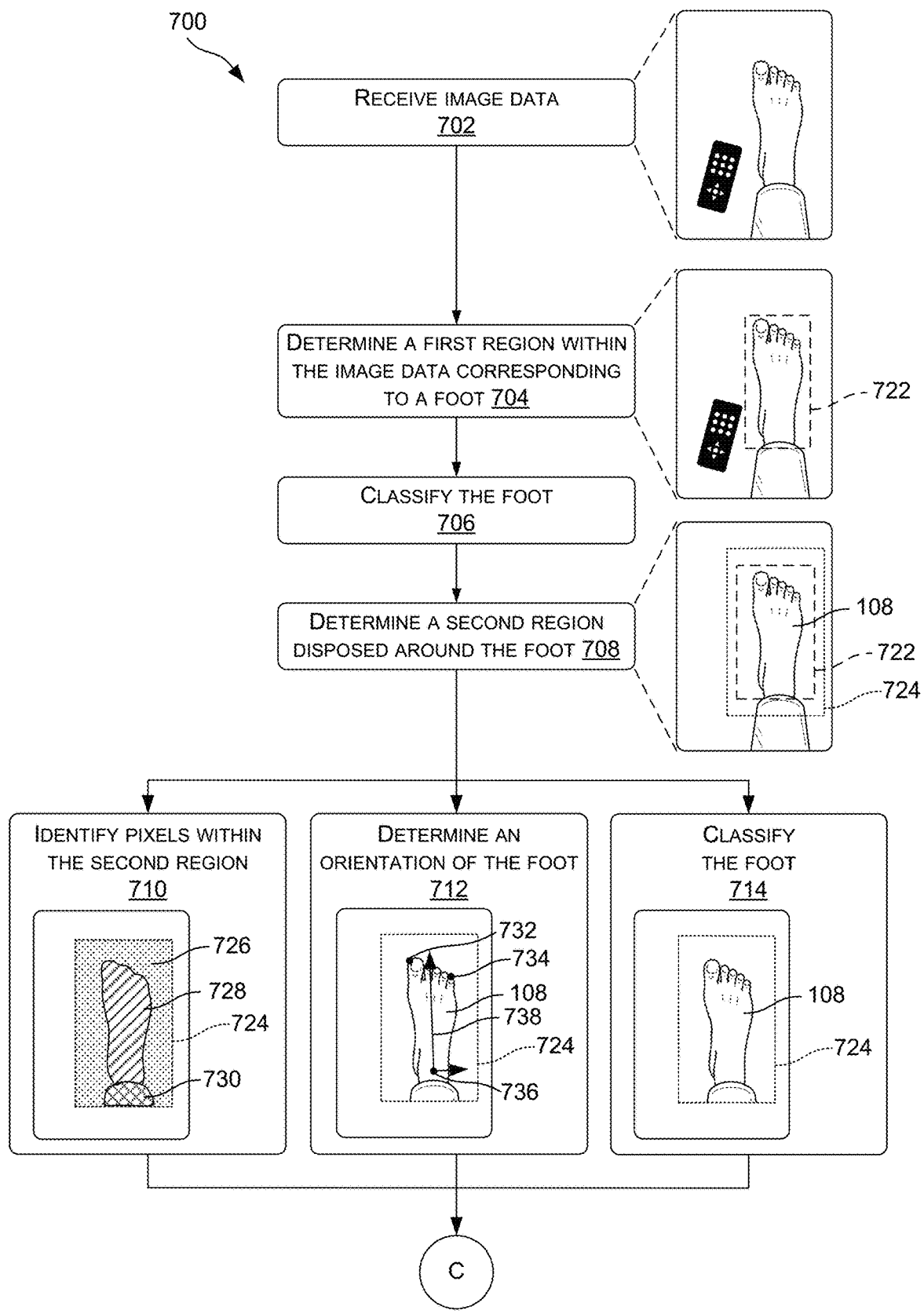
FIG. 7 illustrates an example process for determining regions within an image associated with a portion of a user, such as a foot, for providing a virtual try on environment, according to an example of the present disclosure.

FIG. 7 illustrates an example process 700 for detecting feet of the user 102 and rendering footwear on the feet of the user 102. The process 700 described herein is with regard to detecting one foot of the user 102 and rendering one footwear on the user 102. However, it is to be understood that a similar and parallel process may be performed for detecting other feet of the user 102.

At 702, the process 700 may include receiving image data. For example, the camera 208 of the device 100 may capture the image data 206. In some instances, the user 102 may hold the device 100 and orient the device 100 (or the camera 208) towards their feet. In such instances, however, the portions of the body to which the user 102 orients the device 100 may be based on item(s) for purchase by the user 102. For example, if the user 102 is shopping for wristwear (e.g., watches), the user 102 may orient the camera 208 towards their wrist. In some instances, the device 100 may output an instruction as to the particular area or portion of the user 102 to that the user 102 is to capture image(s). As shown at 702, the image data 206 may include a foot of the user and a remote (e.g., another object).

At 704, the process 700 may include determining a first region within the image data corresponding to a foot. For example, the image analysis component(s) 210 may attempt to detect a foot of the user 102 within the image data 206. This may include, in some instances, using the machine-learned model(s) 216 that are trained to detect feet within image(s). For example, the machine-learned model(s) 216 may detect the foot based on shape, size, orientation, other reference points (e.g., leg, ankle, toes, etc.). The machine-learned model(s) 216 may also identify other objects in the image data 206, but which are not of interest (e.g., non-feet objects). As such, the machine-learned model(s) 216 may filter out these other objects. The machine-learned model(s) 216 may be trained to detect the feet of the user 102 (e.g., bare feet), for example as shown at 704, as well as footwear (e.g., socks, shoes, sandals, etc.) worn by the user 102. In this sense, at 704, the feet may be detected and afterwards, the process 700 may filter out those objects that do not correspond to the feet (e.g., if the leg and/or the legwear is not identified). Further, the machine-learned model(s) 216 may detect the feet from any or all of the different angles that the feet could be positioned and/or based on an orientation of the camera 208 relative to the feet.

The image analysis component(s) 210, such as the object detector 212, may determine a first region 722 surrounding the foot. Determining the first region 722 corresponding to the foot may involve determining pixels of the image data 206 that correspond to the foot. In some instances, the first region 722 may be represented as a bounding box, where pixels within the first region 722 correspond to the foot. Here, the bounding box may be determined based on the location of the detected foot within the image data 206. The object detector 212 may also place a bounding box around another region in the image data 206 that is a non-foot object, such as the remote.

At 706, the process 700 may include classifying the foot. For example, the image analysis component(s) 210, such as the classifier 250, may determine whether the detected foot corresponds to the left foot 106 or the right foot 108 of the user 102. Here, the image analysis component(s) 210 may attached a label to the first region 722, indicating whether the detected foot represents the left foot 106 or the right foot 108. As noted above, even though the process 400 is shown identifying the right foot 108, the process 400 may similarly identify and classify the left foot 106.

At 708, the process 700 may include determining a second region disposed around the foot. In some instances, a second region 724 is determined based on the first region 722, where the second region 724 encompasses or is disposed around the first region 722. As explained herein, the second region 724 may be utilized to determine a context of the first region 722, or the foot identified at 704. For example, the first region 722 is shown including pixels corresponding to the foot, here the right foot 108, but may not show pixels of the leg of the user 102, legwear of the user 102, and so forth. These contextual items, for example, may assist in confirming a detection or lack of the foot within the first region 722. For example, even though a foot may have been detected, at 304, the first region 722 may not correspond to an actual foot. Instead, other objects may resemble the foot, but the actual foot of the user 102 may have been incorrectly identified. The first region 722 is therefore used to determine the second region 724, which subsequently, is used to filter out false positives in which the foot was detected. The second region 724 of the image data 206 is input into a multi-head network, that operates in parallel, to confirm or deny the detection and/or classification of the foot. In some instances, the second region 724 is cropped from other pixels of the image data 206. For example, the segmentation component 222 may segment (e.g., crop) the second region 724 from the image data 206.

At 710, the process 700 may include identifying pixels within the second region. In some instances, identifying the pixels involve the segmentation component 222, for example, using the machine-learned model(s) 216, may identify those pixels corresponding to a background, a foot, and legwear and/or a leg. For example, as shown, first pixels 726 may identify a background of the image data 206 (e.g., carpet, flooring, etc.), second pixels 728 may identify the right foot 108 of the user 102, and third pixels 730 may identify legwear (e.g., pants) and/or the leg of the user 102. Although the process 700 illustrates identifying those pixels corresponding to the right foot 108, the background, and the leg, it is to be understood that in some instances, such pixels may not be identified.

At 712, the process 700 may include determining an orientation of the foot. In some instances, the orientation may be determined based reference point(s). For example, as shown, a first reference point 732 may be associated with a big toe of the user 102, a second reference point 734 may be associated with a small toe of the user 102, and a third reference point 736 may be associated with a heel of the foot. Each of the reference points may be associated with respective pixels within the second region 724 and/or a certain location within the second region 724. Using the reference points, for example, an orientation 738 of the foot may be determined. The orientation 738 may indicate how the foot is facing in multiple directions. For example, as illustrated, the foot may be facing outward from a leg of the user 102. The machine-learning model(s) 216 may receive the second region 724 as an input, and output, the reference point(s) and/or the orientation of the foot.

At 714, the process 700 may include classifying the foot. For example, the image analysis component(s) 210, using the second region 724, may detect and classify the foot. The object detector 212, for example, using the machine-learned model(s) 216 may determine whether the foot was detected. The classifier 250, if the foot was detected, may classify the foot as corresponding to the left foot 106 or the right foot 108 of the user 102. In some instances, the classification of the foot at 714 may be based on machine-learned model(s) 216 that were trained from instances in which feet where incorrectly detected and/or classified within the image data 206. For example, in instances where feet were detected and/or classified at the first stage, but where later determined to be incorrectly detected and/or classified, these instances are used to train the machine-learned model(s) 216. Here, training the machine-learned model(s) 216 may permit the machine-learned model(s) 216 to accurately and effectively filter out those instances in which feet were previously incorrectly detected and classified. In future instances, the machine-learned model(s) 216 may be trained to filter out such occurrences.

In some instances, the operations 710-714 are performed in parallel to determine that the foot of the user 102 is detected within the image data 206, and more specifically, the second region 724. From 710-714, the process 700 may continue to "C," which is discussed in FIG. 8.

Figure 8:
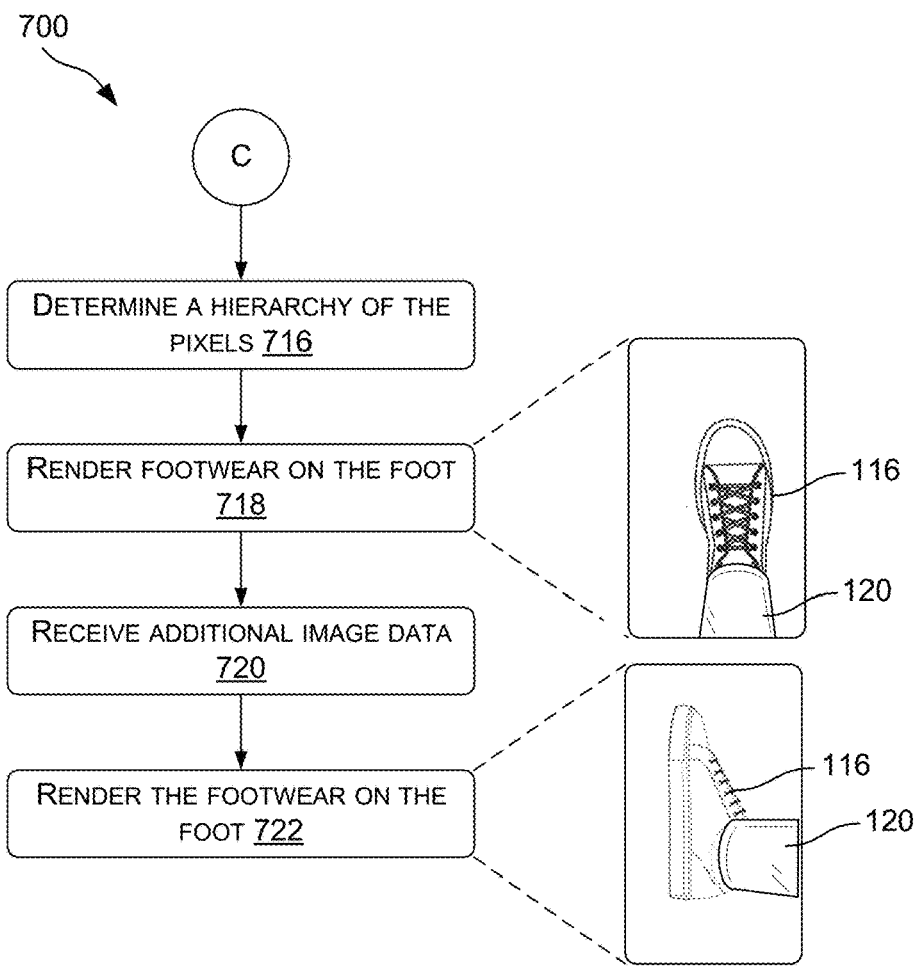
FIG. 8 illustrates a continuation of the process of FIG. 7, according to an example of the present disclosure.

FIG. 8 illustrates a continuation of the process 700 introduced in FIG. 7. For example, from "C" the process 700 may proceed to 716.

At 716, the process 700 may include determining a hierarchy of the pixels. For example, the segmentation component 222 may determine a priority of the pixels to be rendered. Pixels associated with a background of the image data 206, such as the first pixels 726, may include a lowest hierarchy, pixels associated with the portion of the user of interest, such as the second pixels 728, may include a hierarchy greater than the pixels of the background, and pixels associated with clothing and/or other portions of the user 102, such as the leg and the third pixels 730, may have a highest hierarchy. Additionally, pixels associated with the footwear have a hierarchy greater than the second pixels 728, but less than the third pixels 730. For example, when rendering footwear on the foot, first pixels 726 of the background have the lowest hierarchy such that the footwear and the user 102 are displayed on top of the environment. Second pixels 728 of the feet (e.g., the portion of the user 102 of interest) include a hierarchy lower than the footwear such that the footwear is displayed on (e.g., on top of) the foot of the user 102. Third pixels 730 associated with legwear of the user 102 include a highest hierarchy such that the legwear (if present) is displayed over a corresponding portion of the footwear. In this sense, in the event that the legwear covers a portion of the footwear, such as the heel, the rendering provides a realistic impression of such.

At 718, the process 700 may include rendering footwear on the foot. For example, knowing which pixels correspond to the foot permits the rendering component 232 to render the right footwear 116 on the foot of the user 102. The rendering component 232 may render the right footwear 116 on the right foot 108 of the user knowing the classification of the foot (e.g., the right foot 108), the orientation 738 of the foot, and so forth. This allows the right footwear 116 to be rendered on the right foot 108 the user 102, makes the right footwear 116 pointing or oriented in the proper direction, scales the right footwear 116 to the foot of the user 102, and so forth. Moreover, the rendering component 232 selects an appropriate view of the right footwear 116 when rendering the right footwear 116 to match that of the foot of the user 102. By also classifying the pixels of the right legwear 120, such as the third pixels 730, these pixels are displayed on top of the image data of the right footwear 116.

Still, as part of rendering the right footwear 116, the rendering component 232 may scale (e.g., size) the right footwear 116 to that of the right foot 108 of the user 102. In doing so, the right footwear 116 may resemble or physically look like footwear worn by the user 102. In some instances, the device 100 may display the right footwear 116 and the right legwear 120 as segmented from a rest of the environment (e.g., the background). This may allow the user 102 to focus on the right footwear 116 without distractions or other objects in the environment. Alternatively, the device 100 may display the background as faded, transparent, and so forth. In other instances, an alternate background or setting may be displayed (e.g., changing room, etc.) in lieu of the environment. Such alternative background may assist the user 102 in visualizing the footwear.

At 720, the process 700 may include receiving additional image data that is analyzed to determine the classification, orientation, position, and so forth of the foot. Such process identifies the foot of the user 102 for use in rendering the right footwear 116 onto the right foot 108, and based on the orientation and/or position of the right foot 108. In this sense, the user 102 is able to move their foot for observing the right footwear 116 on the user 102 and the display 104 may update in real-time to display the right footwear 116.

At 722, the process 700 may include rendering the footwear on the foot. For example, as the user 102 changes the orientation 738 of the foot and moves the foot, the right footwear 116 is rendered on the foot. However, as shown, the image data or view of the right footwear 116 is selected based on the orientation, position, and so forth of the foot. As such, the display 104 represents a live view back to the user 102 for providing a real-time view of themselves trying on the footwear. In other words, the camera 208 continuously receives image data 206 for output on the display 104, and the display 104 updates in real-time to continuously render the footwear on the user 102. This real-time feed serves as a constant feedback to the user 102 such that they are able to view the footwear from different angles, orientations, and viewpoints.

The process 700 does not illustrate that other objects in the environment are displayed. In some instances, these objects may be filtered out for being displayed, or may be displayed along with the renderings of the footwear. Additionally, just as the user 102 may observe the right footwear 116 on the right foot 108 of the user 102, the user 102 may observe the left footwear 114 on the left foot 106 of the user 102 by placing the left foot 106 within the field of view of the camera 208. In such instances, the left footwear 114 and the right footwear 116 may be rendered at the same time on the display 104.

Figure 9:
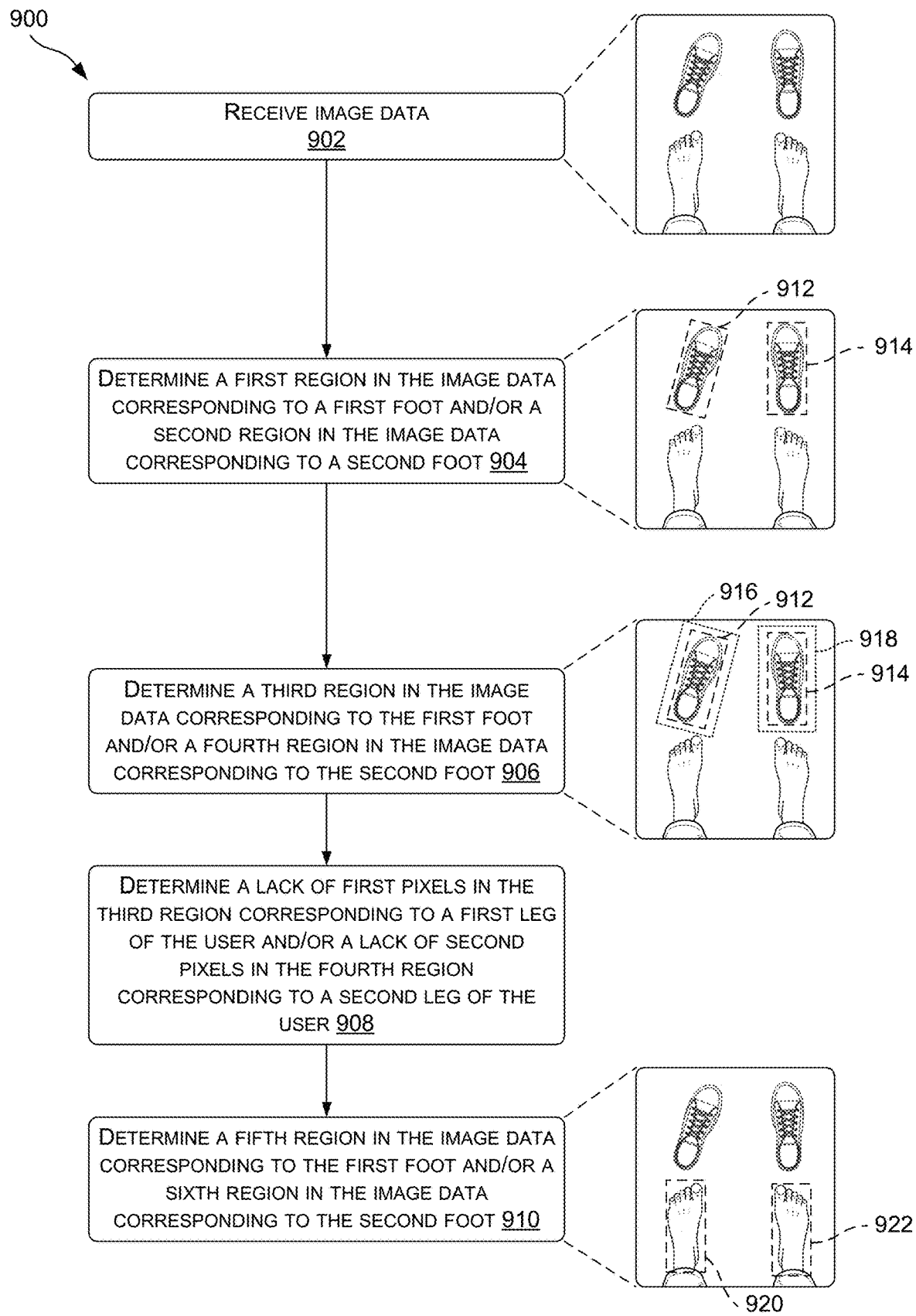
FIG. 9 illustrates an example process for filtering regions of an image that are unrelated to a user, according to an embodiment of the present disclosure.

FIG. 9 illustrates an example process 900 for identifying non-feet within image data in instances where legs and/or legwear are not identified.

At 9022, the process 900 may include receiving image data. For example, based on instructions provided by the client application 236, user 102 may use the camera 208 to capture the image data 206. In some instances, and as shown in FIG. 9, the image data 206 may include the feet of the user and/or footwear previously worn by the user 102. When trying on footwear for purchase, for example, as part of a virtual try on environment, the user 102 may take of their footwear. However, as discussed herein, the user 102 may not be required to remove their footwear for capturing the image data 206, and the computer vision and computer processing techniques discussed herein may detect and classify the feet if the user 102 is wearing socks, footwear, and so forth.

At 904, the process 900 may include determining a first region within the image data corresponding to a first foot and/or a second region within the image data corresponding to a second foot. For example, the image analysis component(s) 210, using computer vision and computer processing techniques, may attempt to detect regions within the image data 206 corresponding to feet of the user 102. Here, the machine-learned model(s) 216 may be trained to detect features within the image data 206 for determining the location and presence of the feet. The feet, in some instances, are detected by placing bounding boxes around corresponding pixels that are associated with the feet. For example, as shown at 904, a first region 912 is associated with a first foot that is detected and a second region 914 is associated with a second foot that is detected.

In some instances, the first region 912 and/or the second region 914 may represent regions (or pixels) within the image data 206 that the image analysis component(s) 210 has a greatest confidence as corresponding to the feet of the user 102. For example, the image analysis component(s) 210 may analyze the image data 206, and detect possible regions corresponding to the feet of the user 102. The regions with the highest confidence may be selected as the regions that correspond to the feet of the user 102. The process 900 may also classify the feet within the detected regions of the image data 206.

At 906, the process 900 may include determining a third region in the image data corresponding to the first foot and/or a fourth region in the image data 206 corresponding to the second foot. The third region and the fourth region may be used to confirm a detection of the feet, as determined at 904. For example, at 906, the process 900 may confirm whether the detected feet at 904 are in fact feet. As part of this, the image analysis component(s) 210 may determine a context of the feet, using the third region and the fourth region, respectively. For example, as shown, a third region 916 may be created around the first region 912, and a fourth region 918 may be created around the second region 914. The third region 916 is shown being larger than the first region 912 in order to determine whether legs and/or legwear of the user 102 is identified, and likewise, the fourth region 918 is shown being larger than the second region 914 in order to determine whether legs and/or legwear of the user 102 is identified. The third region 916 and the fourth region 918 may be cropped from the rest of the image data 206 to confirm the detection and classification of the feet. That is, using the third region 916 and the fourth region 918, the third region 916 and the fourth region 918 may be input into the machine-learned model(s) 216 to determine whether the feet were in fact correctly detected.

At 908, the process 900 may include determining a lack of first pixels in the third region corresponding to a first leg of the user and/or a lack of second pixels in the fourth region corresponding to a second leg of the user. For example, within the third region 916 and the fourth region 918, respectively, the segmentation component 222 may determine pixels that corresponding to the feet, legs, legwear, background, and so forth. The identification of the first pixels and the second pixels, respectively, indicates whether the identified feet are in fact feet. For example, if the first pixels and/or the second pixels are not identified, this may indicate that legs are not connected to the feet detected within the first region 912 and the second region 914, respectively. As such, the feet identified may be associated with non-feet, or other objects.

For example, as shown by the third region 916 and the fourth region 918, the legs of the user 102 are not present. In such instances, the image analysis component(s) 210 may determine that the first pixels and the second pixels were not identified. In doing so, the image analysis component(s) 210 may determine that the objects within the first region 912 and the second region 914 are non-feet objects. In such instances, the rendering component 232 may avoid rendering the footwear on the non-feet objects within the first region 912 and the second region 914.

At 910, the process 900 may include determining a fifth region in the image data corresponding to the first foot and/or a second sixth region in the image data corresponding to the second foot. For example, in instances where the feet where incorrectly detected, the image analysis component(s) 210 may reanalyze the image data 206 in an attempt to locate other regions associated with the feet of the user 102. For example, a fifth region 920 may be detected as corresponding to the first foot and a sixth region 922 may be detected as corresponding to the second foot. Here again, the process 900 may repeat to identify the legs and/or legwear of the user 102. However, at this instance, when a seventh region and an eighth region are determined (surrounding the fifth region 920 and the sixth region 922, respectively), the legs of the user 102 may be identified. In such instances, the process 900 confirms the detection of the feet within the image data 206. Determining whether the legs of the user 102 are present, however, is just one method that may be used to determine whether the feet of the user 102 were detected.

As such, the process 900 illustrates that at a first instance, the image analysis component(s) 210 may detect the feet, and at a second instance, the image analysis component(s) 210 may confirm or deny whether the feet were correctly detected. Initially, however, the classifiers (e.g., left foot 106 and right foot 108) are attached to the most-confident regions in the image data 206 corresponding to the feet, and the image analysis component(s) 210 confirms such classifiers. In the process 900, for example, false positives of the feet are filtered and other portions of the image data 206 are analyzed. This may ensure that footwear is rendered correctly on the feet of the user 102. For example, the process 900 may filter those objects in the image data 206 that do not correspond to the feet in order to prevent the footwear being rendered on such object(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving first image data representing a portion of a user in an environment;
determining a first region in the first image data corresponding to a first foot of the user;
determining a second region in the first image data corresponding to a second foot of the user;
determining a first classifier of the first foot;
determining a second classifier of the second foot;
determining, based on the first region, a third region of the first image data that includes the first region;
providing the third region of the first image data into a multi-head network, the multi-head network being configured to determine, in parallel:
  first pixels within the third region corresponding to the first foot, second pixels within the third region corresponding to a background of the environment, and third pixels within the third region corresponding to a first leg of the user,
  a third classifier of the first foot, and
  a first orientation of the first foot;
determining, based on determining the third pixels within the third region and the third classifier, a confirmation of the first classifier of the first foot;
determining, based on the second region, a fourth region of the first image data that includes the second region;
providing the fourth region of the first image data into the multi-head network, the multi-head network being configured to determine, in parallel:
  fourth pixels within the fourth region corresponding to the second foot, fifth pixels within the fourth region corresponding to the background of the environment, and sixth pixels within the fourth region corresponding to a second leg of the user,
  a fourth classifier of the second foot, and
  a second orientation of the second foot;
determining, based on determining the sixth pixels within the fourth region and the fourth classifier, a confirmation of the second classifier of the second foot;
receiving second image data associated with a first article of footwear to be rendered on the first foot of the user;
receiving third image data associated with a second article of footwear to be rendered on the second foot of the user;
determining, based at least in part on the first orientation of the first foot, a first portion of the second image data to render on the first foot of the user;
determining, based at least in part on the second orientation of the second foot, a second portion of the third image data to render on the second foot of the user;
causing the first portion of the second image data to be rendered on the first foot of the user; and
causing the second portion of the third image data to be rendered on the second foot of the user.

2. The method of claim 1, further comprising:
providing, as an input into a machine-learned model, the first image data;
receiving, as an output from the machine-learned model:
  a first confidence score associated with the first region corresponding to the first foot of the user, and
  a second confidence score associated with the second region corresponding to the second foot of the user; and
determining that the first confidence score and the second confidence score satisfy a threshold confidence,
wherein:
  determining that the first region in the first image data corresponds to the first foot of the user is based on the first confidence score satisfying the threshold confidence, and
  determining that the second region in the first image data corresponds to the second foot of the user is based on the second confidence score satisfying the threshold confidence.

3. The method of claim 1, further comprising:
cropping the third region of the first image data from the first image data; and
cropping the fourth region of the first image data from the first image data,
wherein:
  determining the first pixels within the third region corresponding to the first foot, the second pixels within the third region corresponding to the background of the environment, and the third pixels within the third region corresponding to the first leg of the user is based on cropping the third region of the first image data from the first image data and providing the cropped third region to the multi-head network, and
  determining the fourth pixels within the fourth region corresponding to the second foot, the fifth pixels within the fourth region corresponding to the background of the environment, and the sixth pixels within the fourth region corresponding to the second leg of the user is based on cropping the fourth region of the first image data from the first image data and providing the cropped fourth region to the multi-head network.

4. The method of claim 1, wherein:
determining the third classifier of the first foot is based on detecting a first object within the third region corresponding to the first foot; and
determining the fourth classifier of the second foot is based on detecting a second object within the fourth region corresponding to the second foot.

5. A method comprising:
receiving image data;
determining a first region within the image data corresponding to a first portion of a user;
determining a classifier associated with the first portion of the user;
determining a confidence score associated with the classifier;
determining that the confidence score satisfies a threshold confidence score;
determining, based at least in part on the confidence score satisfying the threshold confidence score, a first confirmation of the classifier associated with the first portion of the user;
determining a second region within the image data that includes the first region;
providing the second region as an input to a multi-head network, the multi-head network being configured to:
  segment (i) one or more first pixels corresponding to the first portion of the user, (ii) one or more second pixels corresponding to a second portion of the user adjoined to the first portion of the user, and (iii) one or more third pixels corresponding to an environment of the user, and
  classify one or more objects within the second region;
determining, based at least in part on segmenting the one or more second pixels and classifying the one or more objects, a second confirmation of the classifier associated with the first portion of the user; and
determining to render an item on the first portion of the user.

6. The method of claim 5, wherein the multi-head network is further configured to determine an orientation of the first portion of the user, further comprising causing, based at least in part on the orientation, the item to be rendered on the first portion of the user.

7. The method of claim 5, wherein classifying the one or more objects within the second region comprises:
detecting an object within the second region corresponding to the first portion of the user; and
determining a second classifier associated with the object, wherein determining to render the item on the first portion of the user is based at least in part on determining the second classifier associated with the first portion of the user.

8. The method of claim 5, wherein segmenting the one or more first pixels, the one or more second pixels, and the one or more third pixels is performed in parallel with classifying the one or more objects within the second region.

9. The method of claim 5, further comprising:
determining a third region within the image data corresponding to a third portion of the user;
determining a second classifier associated with the third portion of the user;
determining a fourth region within the image data that includes the third region;
providing the fourth region as an input to the multi-head network being configured to:
  segment (i) one or more fourth pixels corresponding to the third portion of the user, (ii) one or more fifth pixels corresponding to a fourth portion of the user that is adjoined to the third portion of the user, and (iii) one or more sixth pixels corresponding to the environment of the user, and
  classify one or more second objects within the fourth region;
determining, based at least in part on segmenting the one or more fifth pixels and classifying the one or more second objects, a third confirmation of the second classifier associated with the third portion of the user; and
determining, based at least in part on determining the third confirmation of the second classifier, to render a second item on the third portion of the user.

10. The method of claim 9, further comprising:
causing the item to be rendered on the first portion of the user; and
causing the second item to be rendered on the second portion of the user simultaneously with causing the item to be rendered on the third portion of the user.

11. The method of claim 5, further comprising:
determining a third region within the image data corresponding to a third portion of a user;
determining a second classifier associated with the third portion of the user;
determining a fourth region within the image data that includes the third region;
providing the fourth region as an input to the multi-head network, the multi-head network being configured to determine a lack of one or more fourth pixels corresponding to a fourth portion of the user that is adjoined to the third portion of the user; and
determining, based at least in part on determining the lack of the one or more fourth pixels, to refrain from rendering a second item on the third portion of the user.

12. The method of claim 5, further comprising:
providing, as an input into a machine-learned model, the image data; and
receiving, as an output from the machine-learned model, at least one of:
  a first indication associated with the first region within the image data corresponding to the first portion of the user, or
  a second indication associated with the classifier.

13. The method of claim 5, wherein:
the first portion of the user corresponds to a foot, a hand, a face, or a wrist of the user;
the second portion of the user corresponds to a leg, an arm, or a neck of the user; and
the item corresponds to footwear, wristwear, handwear, or headwear.

14. A device comprising:
a camera;
a display;
one or more processors; and
one or more non-transitory computer-readable media storing computer-executable instructions that, when executed by the one or more processors, cause the one or more processors to perform operations comprising:
  capturing, via the camera, first image data,
  determining, within the first image data, a region associated with a first portion of a user within an environment,
  determining, based at least in part on the region, a second portion of the user adjoined to the first portion of the user,
  determining, based at least in part on the second portion, that the region is associated with the first portion of the user,
  determining an orientation associated with the first portion of the user, determining, based at least in part on the orientation, second image data for rendering on the first portion of the user, and causing, on the display, output of the second image data rendered on the first portion of the user, the second image data being associated with an item worn by the user.

15. The device of claim 14, the operations further comprising:

providing the region of the first image data as an input to a multi-head network, the multi-head network being configured to:

segment (i) one or more first pixels associated with the first portion of the user, (ii) one or more second pixels associated with the second portion of the user, and (iii) one or more third pixels associated with a background of the environment, wherein:

determining that the region associated with the first portion of the user is based at least in part on segmenting the one or more second pixels.

16. The device of claim 15, wherein:

the multi-head network is further configured to:

detect an object corresponding to the first portion of the user, classify the object with a second classifier, and determine an orientation of the first portion; and classifying the object and determining the orientation of the first portion is performed in parallel with segmenting the one or more first pixels, the one or more second pixels, and the one or more third pixels associated with a background of the environment.

17. The device of claim 14, the operations further comprising:

providing, as an input into a machine-learned model, the first image data;

receiving, as an output from the machine-learned model, at least one of:

a first confidence score of the region associated with the first portion of the user, or a second confidence score of a classifier associated with the first portion of the user; and determining that the at least one of the first confidence score or the second confidence score satisfy a threshold confidence, wherein determining that the region is associated with the first portion of the user is based at least in part on determining that the at least one of the first confidence score or the second confidence score satisfy the threshold confidence.

18. The device of claim 14, the operations further comprising:

capturing, via the camera, third image data;

determining, within the third image data, a second region associated with the first portion of the user within the environment;

determining, based at least in part on the second region, that the second portion of the user is adjoined to the first portion of the user;

determining, based at least in part on determining the second portion, that the second region is associated with the first portion of the user; and causing, on the display, output of fourth image data rendered on the first portion of the user, the fourth image data being associated with the item worn by the user.

19. The device of claim 14, the operations further comprising:

determining, within the first image data, a second region associated with a third portion of the user within the environment;

determining, based at least in part on the second region, whether a fourth portion of the user is present;

determining, based at least in part on the fourth portion, that at least one of:

the second region is associated with the third portion of the user, or the second region is unassociated with the third portion of the user; and one of:

causing, on the display, output of third image data rendered on the third portion of the user based at least in part on determining that the second region is associated with the third portion of the user, or refraining from causing, on the display, output of the third image data rendered on the third portion of the user based at least in part on determining that the second region is unassociated with the third portion of the user.

20. The device of claim 14, the operations further comprising segmenting first pixels associated with the first portion of the user, second pixels associated with the second portion of the user, and third pixels associated with a background of the environment, wherein determining the orientation is based at least in part on the first pixels.

* * * * *